(12) United States Patent
Donnelly et al.

(10) Patent No.: US 10,033,751 B2
(45) Date of Patent: Jul. 24, 2018

(54) DYNAMIC TRAFFIC STEERING SYSTEM AND METHOD IN A NETWORK

(71) Applicant: Adaptive Mobile Security Limited, Dublin (IE)

(72) Inventors: Darrel Donnelly, Dublin (IE); Brendan Dillon, Dublin (IE); Jim Donnelly, Dublin (IE); Hugh Carr, Dublin (IE)

(73) Assignee: Adaptive Mobile Security Limited, Dublin (IE)

( * ) Notice: Subject to any disclaimer, the term of this patent is extended or adjusted under 35 U.S.C. 154(b) by 0 days.

(21) Appl. No.: 14/770,086

(22) PCT Filed: Feb. 21, 2014

(86) PCT No.: PCT/EP2014/053486
§ 371 (c)(1),
(2) Date: Aug. 24, 2015

(87) PCT Pub. No.: WO2014/128284
PCT Pub. Date: Aug. 28, 2014

(65) Prior Publication Data
US 2016/0006755 A1 Jan. 7, 2016

Related U.S. Application Data

(60) Provisional application No. 61/768,116, filed on Feb. 22, 2013.

(30) Foreign Application Priority Data

Mar. 22, 2013 (EP) .................................... 13160738

(51) Int. Cl.
*H04L 29/00* (2006.01)
*H04L 29/06* (2006.01)

(52) U.S. Cl.
CPC ...... *H04L 63/1425* (2013.01); *H04L 63/0236* (2013.01); *H04L 63/0245* (2013.01);
(Continued)

(58) Field of Classification Search
CPC ......... H04L 63/02; H04L 63/01; G06F 21/05; G06F 21/06
See application file for complete search history.

(56) References Cited

U.S. PATENT DOCUMENTS 7,891,001 B1 2/2011 Greenawalt et al.
8,565,755 B1 10/2013 Badakere Ramachandra et al.
(Continued)

FOREIGN PATENT DOCUMENTS

WO WO 2014/128284 A1 8/2014

OTHER PUBLICATIONS

Sherry, J., et al., "Making Middleboxes Some Else's Problem: Network Processing as a Cloud Service," *Applications, Technologies, Architectures, and Protocols for Computer Communication*, ACM, 2 Penn Plaza, Suite 701, New York, NY, pp. 13-24 (2012).
(Continued)

*Primary Examiner* — Madhuri R Herzog
(74) *Attorney, Agent, or Firm* — Hamilton, Brook, Smith & Reynolds, P.C.

(57) ABSTRACT

The invention provides a security system and method for use in a communications network, said network comprising means to allow a plurality of devices to communicate over the network; a security agent configured on at least one device and adapted to communicate with the security system; said system comprising: means for performing dynamic intelligent traffic steering from the device based on analysis of data traffic on the network or on the device, wherein the steering decision can be made to select a channel on a per flow basis.

23 Claims, 11 Drawing Sheets

(52) U.S. Cl.
CPC ...... *H04L 63/0263* (2013.01); *H04L 63/1408* (2013.01); *H04L 63/1441* (2013.01); *H04L 63/18* (2013.01); *H04L 63/20* (2013.01)

(56) References Cited

U.S. PATENT DOCUMENTS

| | | | |
|---|---|---|---|
| 8,984,632 | B1 | 3/2015 | Laffoon et al. |
| 9,351,167 | B1 | 5/2016 | Adams et al. |
| 9,558,348 | B1 | 1/2017 | Muttik |
| 9,813,433 | B2 | 11/2017 | McDaid et al. |
| 2001/0039623 | A1* | 11/2001 | Ishikawa ............... H04L 12/12 726/23 |
| 2003/0200464 | A1* | 10/2003 | Kidron ................. H04L 63/145 726/22 |
| 2004/0148520 | A1* | 7/2004 | Talpade .............. H04L 63/1458 726/22 |
| 2004/0268147 | A1* | 12/2004 | Wiederin .............. G06F 21/567 726/12 |
| 2005/0091532 | A1 | 4/2005 | Moghe |
| 2008/0178294 | A1 | 7/2008 | Hu et al. |
| 2010/0223669 | A1* | 9/2010 | Vermeulen .......... H04L 63/0236 726/23 |
| 2011/0047620 | A1 | 2/2011 | Mahaffey et al. |
| 2012/0151033 | A1 | 6/2012 | Baliga et al. |
| 2012/0220326 | A1 | 8/2012 | Li et al. |
| 2012/0294158 | A1 | 11/2012 | Boot et al. |
| 2013/0031037 | A1* | 1/2013 | Brandt ................ H04L 63/1408 706/12 |
| 2013/0185445 | A1* | 7/2013 | Larkin ................ H04L 65/1016 709/228 |
| 2013/0276135 | A1* | 10/2013 | Conklin ................ G06F 21/554 726/27 |
| 2013/0291100 | A1 | 10/2013 | Ganapathy et al. |
| 2014/0040503 | A1* | 2/2014 | Mower ............... H04L 12/6418 709/238 |
| 2016/0006753 | A1 | 1/2016 | McDaid et al. |
| 2016/0014149 | A1 | 1/2016 | Bradley et al. |
| 2016/0182662 | A1 | 6/2016 | Casey et al. |

OTHER PUBLICATIONS

Notification of Transmittal of the International Search Report and the Written Opinion of the International Searching Authority, or the Declaration, for International Appl. No. PCT/EP2014/053486, dated May 30, 2014, consisting of 12 pages, entitled "Dynamic Traffic Steering System and Method in a Network."

Shabtai, Asaf, et al., ""Andromaly": a behavioral malware detection framework for android devices," Journal of Intelligent Information Systems 38.1 (2012): 161-190.

* cited by examiner

DYNAMIC TRAFFIC STEERING SYSTEM AND METHOD IN A NETWORK

This application is the U.S. National Stage of International Application No. PCT/EP2014/053486, filed Feb. 21, 2014, which designates the U.S., published in English, and claims priority under 35 U.S.C. §§ 119 or 365(c) to EP Application No. 13160738.4, filed Mar. 22, 2013, and claims the benefit of U.S. Provisional Application No. 61/768,116, filed Feb. 22, 2013. The entire teachings of the above applications are incorporated herein by reference.

FIELD OF THE INVENTION

The invention relates to managing data traffic in a communications network. In particular the invention relates to a dynamic traffic steering system and method in a network.

BACKGROUND TO THE INVENTION

Network traffic such as IP traffic (including IP messaging events traffic) is growing voluminously and with such growth comes attendant increases in challenges and security threats.

There are well known methods for collection of such data from the network including for example mass collection of statistics on IP traffic from the network.

However identifying such threats within such voluminous traffic much of which is normal benign traffic, presents major challenges, including performance challenges.

Also collecting all data has drawbacks in terms of being able to receive targeted pertinent information for analysis. It is neither desirable or practical for resource constrained services such as for example security services, which can be required to do resource intensive data analysis and detailed processing, to receive all traffic, in the context of such voluminous traffic. Rather there is a need to have traffic that is of interest to such a service to be selectively sent to it, and the bulk of the traffic not being sent to the resource constrained service but being offloaded to more capacious communication channels or pipes.

Further the threat landscape is constantly evolving and what is increasingly demanded, including from operators (such as mobile or fixed telecom operators), enterprises and consumers is a more comprehensive approach to threat detection, control and mitigation.

Static routing is well known in the art for splitting traffic between different destinations, and can be used to differentiate communications based on routing rules defining interfaces to be used for different IP subnets of traffic. Examples of such systems are disclosed in US patent publication numbers US2004/268147; US2006/037075; US2008/282080 and US2010/223669. The systems do not however allow steering decisions about traffic to be made dynamically either in response to traffic type, originating application, general security threat levels prevalent at the time or other factors. Thus there is a lack of dynamic control as to which data is sent over which communications channel.

Therefore there is a need for dynamic methods to target and collect suspicious traffic and dynamic methods for security threat detection, mitigation and control.

It is therefore an object of the invention to provide a dynamic traffic steering system and method in a network.

SUMMARY OF THE INVENTION

According to the invention there is provided, as set out in the appended claims, a security system for use in a communications network, said network comprising means to allow a plurality of devices to communicate over the network; a security agent configured on at least one device and adapted to communicate with the security system; said system comprising:

means for performing dynamic intelligent traffic steering from the device based on analysis of data traffic on the network or on the device, wherein the steering decision can be made to select a channel on a per flow basis.

In one embodiment there is provided means to dynamically control which user device data communications are steered via a particular path and/or based on information received from at least one security agent.

In one embodiment there is provided means to perform control communications to the security agent to implement control measures, such as targeted traffic steering such as to direct which user device data communications are sent on a particular path.

In one embodiment there is provided means to analyse communication information available from a device and based on such analysis perform control communications to the security agent to implement control measures such as targeted traffic steering.

In one embodiment there is provided means for mitigating threats through applying other intelligent dynamic control means such as means to block and/or redirect such communications/traffic.

In one embodiment the control communications comprises means for blocking enterprise traffic and/or internet traffic to/from the device, or blocking traffic, for example for a particular user device for a particular service, for a particular application, for a particular protocol or on a particular session whilst allowing other traffic.

In one embodiment there is provided a dedicated secure control and communication channel between the security agent and the security system.

In one embodiment the dedicated secure control and communication channel comprises a VPN tunnel.

In one embodiment there is provided means for sending a control message from the network security system to the security agent on the device and traffic can be steered dynamically with the security agent directing which user device communications/traffic is sent on which control and communication channel.

In one embodiment the steering decision can be made on a per flow basis.

In one embodiment the steering decision can be based on per flow control message from the network security system.

In one embodiment the steering decision can be based locally on a previously pushed policy rule set from the network security service (being pushed to the security agent of the device).

In one embodiment the steering decision can be based locally (independently of the network security service) with the security agent on the device being capable of steering traffic based on protocol, application or process.

In one embodiment a flow comprises a stream of IP packets relating to a given traffic session.

In one embodiment wherein any combination of network traffic and/or network flow records/statistics and/or network event records/statistics is being steered from the security agent to the security system then based on performing analysis of the network flow records/statistics and/or network event records/statistics and or network flow traffic, a control message can be originated on the control channel from the security system to the security agent on the device and further or additional network traffic and/or network flow records/statistics and/or network event records/statistics can be dynamically steered from the security agent to the security system.

In one embodiment there is provided means to control the dynamic traffic steering by communication with the security agent based on said analysis and use of DNS communications.

In one embodiment there is provided means to control the dynamic traffic steering by communication with the security agent based on said analysis and use of DNS communications in conjunction with control messages.

In one embodiment means to handle any data traffic and adapted to inspect all packet formats for filtering, analysis and control comprising dynamic intelligent targeted traffic steering and applying other dynamic control means such as appropriate security defensive measures, such as for example means to block and/or redirect such communications/traffic.

In one embodiment the data traffic comprises internet or IP traffic and/or wherein the data traffic comprises any type of messaging traffic or communication for instance a network event.

In one embodiment the security agent comprises an agent filtering module with means to perform packet inspection and filtering on the device.

In one embodiment the security agent is adapted to perform packet inspection on the device, determining an applicable protocol and applying policy control on the device.

In one embodiment there is provided means for implementing at least one policy wherein the policy comprises a rule set and means for associating a subscriber device with the policy.

In one embodiment the rule set can be based on observed behaviour of the device by the security system using the analysis means such as a security analytics module and/or a filtering module, wherein a rule set can be pushed as a control message by the system to the security agent on the device.

In one embodiment a rule set can be pushed as a control message by the system to the security agent on the device independently of and without requiring subscriber policies to be provisioned.

In one embodiment a device can be dynamically assigned to such policies based on device behavioural analysis and/or filtering by the security system.

In one embodiment a policy based rule set or an alternative rule set that can be communicated to the security agent on the device comprises dynamic traffic steering and/or other dynamic control means such as appropriate and targeted security defensive measures such as communications/traffic blocking and/or redirection.

In one embodiment the system is adapted to determine that a device activity matches normal characteristic patterns and assigns a policy to that device configured for said matched characteristic pattern and/or wherein the policy results in none of the device's traffic being steered to the security system.

In one embodiment the system is adapted to determine that a device activity matches out of the ordinary characteristic patterns and assigns a policy to that device configured for said matched characteristic pattern and/or wherein the policy results in some or all of the device's traffic being steered to the security system and/or wherein the out of the ordinary characteristic is identified to pose a security or other threat or signifies malicious or undesirable/inappropriate activity.

In one embodiment the system is adapted to determine that a device is diverging from a normal characteristic pattern to an unknown pattern and assigns a policy to that device configured for said matched unknown characteristic pattern and/or wherein the policy results in some or all of the device's traffic being steered to the security system for analysis and/or such that the unknown characteristic pattern can be identified and/or classified as a pattern.

In one embodiment there is provided means for storing a history based on a device activity over time and device propensity to exhibit suspicious or normal behaviour in the past influences to determine which policy is assigned to the device and/or any behavioural changes results in a new policy assigned to the device based on analysis of such behavioural changes.

In one embodiment there is provided means to store the traffic patterns to and from devices, said patterns are adapted to be used as baseline reference traffic patterns for detecting other devices.

In one embodiment there is provided means for identifying normal traffic characteristic patterns, said patterns are adapted to be used as baseline patterns for detection of patterns of behaviour which deviate from these normal behavioural patterns.

In one embodiment there is provided means to ascertain if there are traffic patterns corresponding to normal characteristic patterns associated with a device activity, and/or means to ascertain out of the ordinary communication patterns associated with a device activity, wherein said patterns are configured to be used as control signature patterns for detecting other devices behaving abnormally.

In one embodiment the security agent is adapted to generate network flow records comprising statistics for traffic to or from the device and/or the security agent is adapted to supplement such records and/or generate additional informational records as a result of generating additional device and traffic related information available to the security agent and is adapted to send the records to the security system.

In one embodiment the security agent is adapted to generate network event records comprising statistics or other information for traffic or events pertaining to the user device, such as records comprising statistics or other information for messaging traffic or events, such as records comprising statistics for SMS events), and is adapted to send the records to the security system.

In another embodiment of the invention there is provided a security system for use in a communications network, said network comprising means to allow a plurality of devices to communicate over the network:
  means for analysing data traffic on the network; and
  means for performing dynamic intelligent traffic steering based on said analysis.

In one embodiment the security system is adapted to provide control communications with at least one device, such communication comprises control communications with the device originating commands and sending to the device to control communications/traffic the device sends on a control and communication channel and/or the security system comprises means to push one or more rules or rule sets to the device as a control communication; and/or wherein the control command comprises means for blocking enterprise traffic and/or internet traffic to/from the device, or for example blocking traffic for a particular user device for a particular service, or on a particular session whilst allowing other traffic.

In another embodiment there is provided a security system for use in a communications network, said network comprising means to allow a plurality of devices to communicate over the network means for analysing data traffic on the network; and means for performing dynamic intelligent traffic steering based on said analysis.

In another embodiment there is provided a security method for use in a communications network, said network comprising means to allow a plurality of devices to communicate over the network, said method comprising the step of analysing data traffic on the network; and performing dynamic intelligent traffic steering based on said analysis.

Various other embodiments of the invention are defined by the dependent claims.

It is beneficial for resource constrained services such as for example security services which can be required to do resource intensive data analysis and detailed processing, to have traffic that is of interest to that service to be selectively sent to it. This is especially beneficial in the context of voluminous traffic, where it is not desirable or practical to receive all traffic. It is particularly beneficial where the traffic can be selectively steered from at least one particular endpoint device, where the bulk of the traffic need not go to the resource constrained service but can be offloaded to more capacious communication channels or pipes, and only the traffic that is of interest to the service such as a security service is steered towards the service. This advantageously minimises resources such as CPU and bandwidth required at the service.

Although the embodiment described herein concerns a security service, the invention is generally applicable to any resource constrained services, which would benefit from not processing all the traffic. Thus the invention is advantageous to services such as any general TCP communication or specific high bandwidth applications such as TCP or UDP video streaming which may be downlink optimised in a network based service through the invention steering traffic via an optimisation service. This is particularly beneficial to mobile operators for which radio resources are at a premium.

Static routing is well known in the art for splitting traffic between different destinations, and can be used to differentiate communications based on routing rules defining interfaces to be used for different IP subnets of traffic. This does allow, for example, traffic for a specific static resource to be reached via a VPN while other resources are accessed directly. It does not however allow steering decisions about traffic to be made dynamically either in response to traffic type, originating application, general security threat levels prevalent at the time or other factors. Thus there is a lack of dynamic control as to which data is sent over which communications channel.

The invention solves this problem by providing a dynamic control means to steer traffic, intelligently, on a per flow basis, via several destination gateways (in one embodiment several VPN tunnels and an un-tunnelled direct path). A flow in the context of this invention is considered as being the complete stream of IP packets relating to a given session. For example in the case of TCP/IP or UDP/IP a flow identifier will be defined by a five tuple made up of source IP address, destination IP address, source port number, destination port number and the protocol in use. By un-tunnelled is meant that the communications path does not use a VPN tunnel.

The intelligence of what traffic to steer where may reside locally on the device in the form of rules (which may or may not be pushed from the network security service). These rules may determine which gateway is associated with different specific device applications or application groups e.g. Instant messaging or general browsing, different protocols such as HTTP or XMPP, or definitions of enterprise resources (may be for example via lists of IPs, subnets or domains).

In addition to these local decisions, the network security service may send control messages to the device, via a proprietary control channel, which specifies policies enforcing that traffic to certain IP addresses should be steered to a certain location. All DNS traffic is steered via the network security service control channel (in one embodiment a VPN tunnel), allowing the Network Security Service to make decisions about whether traffic for a given domain (as determined by inspection of the DNS response), should be sent via a given gateway. In this instance a proprietary control message is sent to the device, before the release of the DNS response, which associates the destination IP addresses from the DNS resolution (present in the DNS response) with a given channel, empowering the device to decide to steer flows associated with the domain in question, according to the communicated policy.

In one embodiment, in order to achieve the dynamic intelligent steering the security agent creates a VPN service (in one embodiment a linux TUN device) which is configured as the default gateway to receive traffic bound for all destination IP addresses. The security agent then determines a flow identifier for each packet sent via the VPN service, and determines a gateway or tunnel associated with the flow identifier by means of the methods outlined above. The packets are then transferred using the selected gateway (in one embodiment a tunnel, either of a proprietary technology or existing VPN technology such as IPSec or L2TP).

Thus the invention has flexible and dynamic control means to perform dynamic intelligent traffic steering.

The network security service can analyse all types of communications including IP (Internet Protocol) and messaging (such as Short Message Service (SMS)) on the network or received from a device, including filtering such communications and determining and executing (or causing to be executed) appropriate actions. Such analysis includes performing analytics such as security analytics. The network security service has means for configuring and acting on policy based rule sets. Filtering, analysis and policy are important aspects of the network security service, and provide inputs to the steering control module of the invention and contribute to the steering decisions of the steering control module which are pushed as control messages (which can for example be a rule set) via a control channel to the security agent of the invention.

The invention has flexible and dynamic control means to perform dynamic intelligent traffic steering based on such analysis, filtering and policy control. The invention has means to dynamically control which user device communications are directed where.

The invention includes a security agent which is installed on at least one device, and communicates with the network security service, with such communication including control communications with the network security service originating commands controlling which user device communications/traffic the security agent sends on which control and communication channel (for example which communications/traffic are steered to the network security service).

The invention provides means for such communication to be over dedicated secure control and communication channels, which in one embodiment can be a VPN tunnel, or in an alternative embodiment can use a protocol such as HTTP or HTTPS where the network security service acts as a HTTP or HTTPS proxy, or in yet an alternative embodiment the HTTP or HTTPS protocol could be used in a VPN tunnel.

In one embodiment the security agent on the device comprises a plurality of tunnels, each tunnel is configured for a different service.

In one embodiment a first tunnel is configured for enterprise services, a second tunnel is configured to direct traffic to a network security service and a third un-tunnelled path is for general internet traffic.

In one embodiment the security agent is configured to determine a flow identifier for each packet sent via a VPN service, and further configured to determine a gateway or tunnel associated with the flow identifier.

In one embodiment the security agent steers traffic onto a tunnel based on the determined flow identifier.

In one embodiment the security agent is configured to make steering decisions about traffic dynamically either in response to traffic type, originating application, general security threat levels prevalent at the time or other factors by steering the traffic to the appropriate VPN tunnel.

In one embodiment there is provided means to control the dynamic traffic steering by communication with the security agent based on said analysis and use of DNS communications.

In one embodiment there is provided means to control the dynamic traffic steering by communication with the security agent based on said analysis and use of DNS communications in conjunction with control messages.

In one embodiment the control messages originated from the network security service may be triggered synchronously by DNS messaging prior to an IP session establishment or asynchronously as an input to a decision local to the security agent.

The security agent on a user device generates network flow records/statistics (which in one embodiment can be aggregated but in alternative embodiments need not be aggregated) for all packet switched traffic pertaining to the user device, which are sent or uploaded (which in one embodiment can be periodically but in alternative embodiments need not be periodically) to the network security service.

The security agent on a user device generates network event records/statistics for events pertaining to the user device, including messaging event records/statistics (including SMS event records/statistics), which are sent or uploaded (which in one embodiment can be periodically but in alternative embodiments need not be periodically) to the network security service.

Thus in the case of SMS, the security agent generates statistics (in one embodiment in a proprietary event record format but can employ other appropriate means) for inbound and outbound SMS messages, which the security agent periodically sends or uploads to the network security service (in one embodiment the security analytics system/module of the network security service), for analysis. The event record format contains for example such fields as the originating address, destination address, content length, URLs if present in content, etc.

The network security service performs analysis of the received network flow records/statistics and/or network event records/statistics. In one embodiment such analysis can be performed offline. In alternative embodiments such analysis need not be performed offline, for example network flow records/statistics and/or network event records/statistics could be uploaded and analysed in real or near real time, etc.

Based on such analysis, a control message(s) can be originated from the network security service to the security agent on the device and traffic can be steered dynamically with the security agent directing which user device communications/traffic is sent on which control and communication channel (for example which communications/traffic are steered to the network security service). This traffic which is steered dynamically to the network security service can also then be analysed. Control messages originated from the network security service may be triggered synchronously by DNS messaging prior to IP session establishment or asynchronously as an input to a decision local to the security agent.

DNS in this invention is used as a means to detect and steer traffic which may potentially be of interest to the security service. The policy or analysis decision is made on the HTTP request sent to the network security service in contrast to other DNS based filtering systems. Such decisions can be made based not only on the domain of the request but also on other attributes of the traffic, for example in the case of HTTP the Universal Resource Indicator. This allows differentiation of legitimate vs suspicious or malicious resources which may happen to be hosted on the same domain or IP address.

Thus if for example no network traffic is being steered from the security agent to the network security service (for example only network flow records/statistics are being uploaded) then based on performing analysis of the network flow records/statistics, a control message(s) can be originated on the control channel from the network security service to the security agent (on the device) and traffic can be dynamically steered from the security agent (for example internet traffic) to the network security service.

Thus the invention has the means to analyse whatever communications information is available from a device (for example network flow records/statistics, network event records/statistics and/or traffic etc.) and based on such analysis provide input to the network security service steering control module to perform control communications to the security agent of the invention to perform control measures such as targeted traffic steering or communications/traffic blocking.

Thus the invention has means to identify whether communications on the network or received from a device pose a security or other threat or signifies malicious activity or is inappropriate communication and has means for performing control communications to the security agent to perform control measures such as targeted traffic steering or for applying appropriate security defensive measures such as for example means to block such communications/traffic.

Such dynamic traffic steering can for example include:
some traffic being directed from a user device to the network security service for analysis and filtering,
some internet traffic being routed directly from the user device to the internet (without network security service filtering),
enterprise traffic from the user device being directed to the enterprise, Etc.

The invention also has other flexible and dynamic control means such as for example means to:
dynamically block traffic such as for example blocking all traffic from/to a particular user device,
blocking all traffic between a particular user device and an enterprise network,
blocking all traffic between a particular user device and the internet, or even more surgical and targeted flexible and dynamic control means such as for example:

blocking traffic for a particular user device for a particular service, blocking traffic on a particular session etc, performing intelligent dynamic flow redirection, for example communication being redirected to an informational Web page in the case of an inappropriate service being requested, or for example impersonating a command and control centre for remote control whilst allowing other traffic.

Thus the invention enables dynamic targeted network communications control with the ability to apply wide-ranging, comprehensive, and targeted security policies and rule sets, including for example at the network, device, service, application, protocol, and session levels, etc.

The network security service has means to control such flexible and dynamic traffic steering, by communication with the security agent. In one embodiment such control can be based on analysis and use of DNS communications. In another embodiment such control can be based on analysis and use of DNS communications in conjunction with control messages.

The network security service of the invention can handle all traffic and is capable of inspecting all packet formats for filtering, analysis and control including dynamic intelligent targeted traffic steering and applying appropriate security defensive measures such as for example means to block such communications/traffic.

As well as the network security service of the invention having means to perform packet inspection and filtering, the security agent of the invention has means to perform packet inspection and filtering on the device. The security agent of the invention can steer traffic based on packet inspection.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

The invention will be more clearly understood from the following description of an embodiment thereof, given by way of example only. If in the embodiment description there are some details applicable to Web browsing and filtering, this is in no way to be construed that the invention is more applicable to Web traffic as the invention is applicable to many varied types of communications including IP and messaging.

Figure 1A:
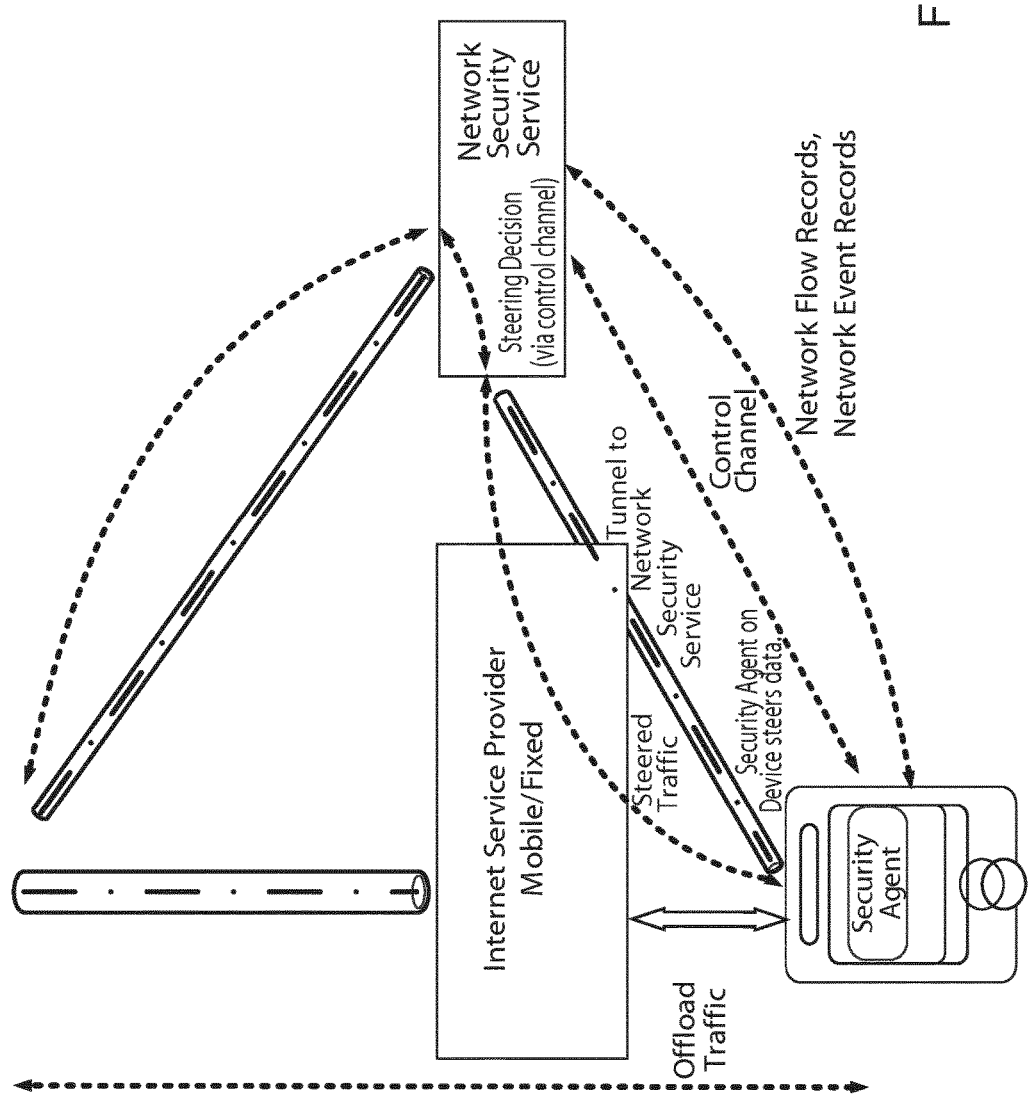
FIG. 1a illustrates at a high level a network environment in which a network security service according to the invention may operate and communicates with one or more devices containing a security agent according to the invention.

FIG. 1a illustrates at a high level a network environment in which a network security service according to the invention may operate and communicates with one or more devices containing a security agent according to the invention. Such communication includes control communications with the network security service originating commands and sending them via a secure control channel (e.g. VPN tunnel) to the security agent, controlling which user device communications/traffic the security agent sends on which control and communication channel (for example which communications/traffic are steered to the network security service).

In FIG. 1a (and FIG. 1b) the control channel is depicted separately from the tunnel to the network security service, however the control channel can be the network security service tunnel with all communications between the security agent and the network security service, including control communications, traffic, and network flow records/statistics and/or network event records/statistics being sent on the control and communications tunnel to the network security service, or in an alternative embodiment the control channel could be a separate communications channel (tunnelled or un-tunnelled).

Thus for example on a per service request basis (for example a HTTP request) the security agent connects to the security service and originates a request to the security service enquiring as to which route traffic should be directed. The network security service makes a steering decision and responds to the security agent indicating the desired path for the traffic. The security agent steers the traffic accordingly (in one embodiment steering the traffic means that the traffic is steered onto the appropriate VPN tunnel). In one embodiment the request made to the security service is a DNS request, the security service inspects the DNS response (destined for the client) and sends a proprietary control message with the steering decision, before releasing the DNS response to the client (which triggers the connection to be attempted).

Thus advantageously the security agent can selectively steer the traffic (according to the control communications) from the end-point device on which it is installed, so that the bulk of the traffic need not go to the resource constrained network security service (which can be required to do resource intensive data analysis and detailed processing) but can be offloaded to more capacious communication channels or pipes (of the Internet Service Provider in the example depicted in FIG. 1a), and only the traffic that is of interest is steered towards the security service. This advantageously minimises resources such as CPU and bandwidth required at the security service.

Figure 1B:
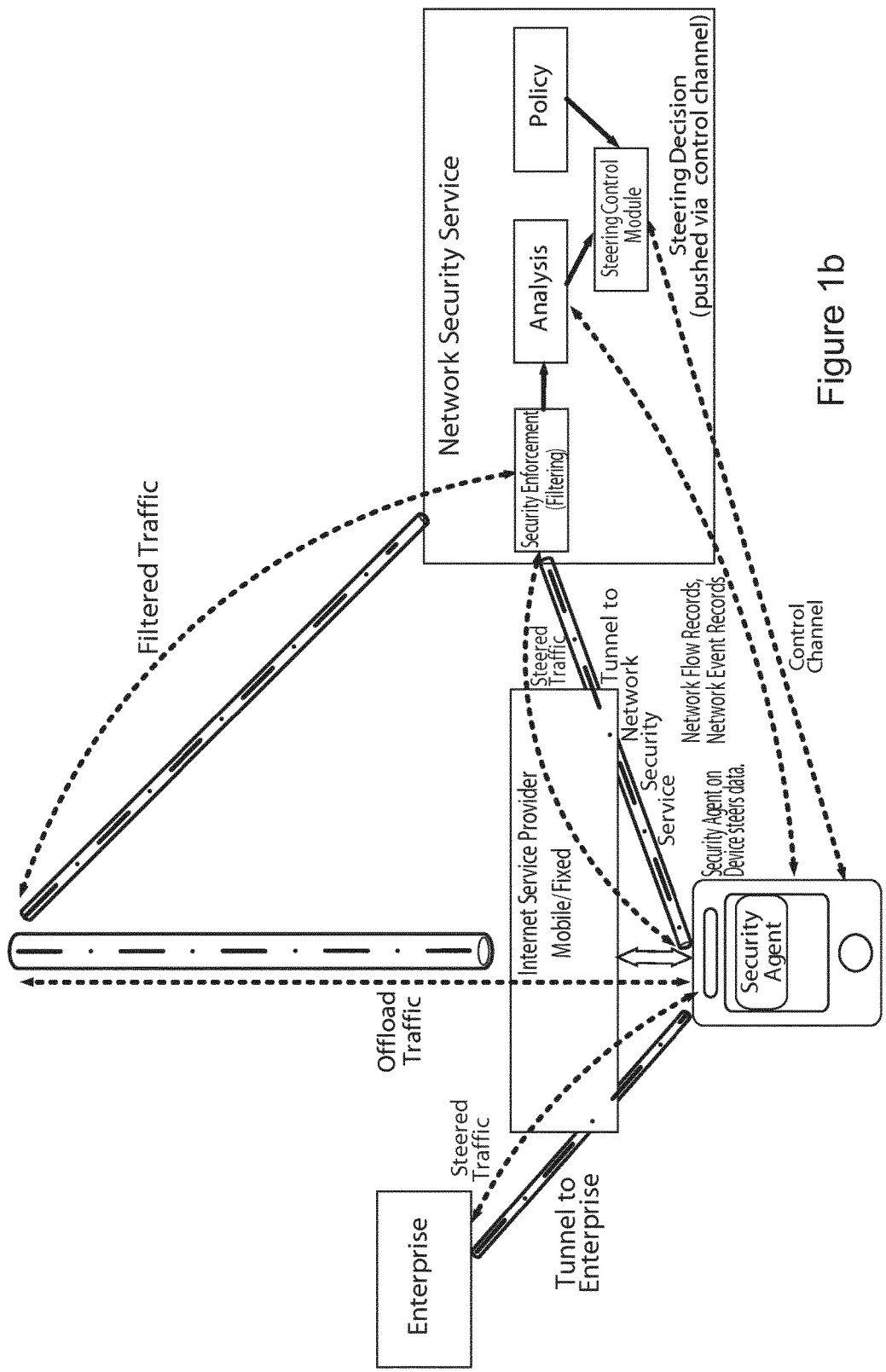
FIG. 1b illustrates in more detail the network security service in a network environment in which the network security service according to the invention may operate and communicates with one or more devices containing a security agent according to the invention.

FIG. 1b illustrates in more detail the network security service in a network environment in which a network security service according to the invention may operate and communicates with one or more devices containing a security agent according to the invention.

In one embodiment as illustrated in FIG. 1b, the network security service has a security enforcement (filtering) module, an analysis module (which in one embodiment can be a security analytics module), a policy module (which has means for configuring and acting on policy based rule sets) which are important aspects of the network security service, and provide inputs to the network security service steering control module of the invention and contribute to the steering decisions of the steering control module which are pushed via a control channel to the security agent of the invention.

The security agent (of the invention) on a device is in communication with a network security service (of the invention), an enterprise network, and the internet. In the case of each of the enterprise network and the network security service, the invention provides means for such communication to be over a dedicated secure control and communication channel, which in one embodiment can be a VPN tunnel.

Thus the security agent on the device can have multiple tunnels which may be designated for different services. For example as illustrated in FIG. 1b, one tunnel may be designated for enterprise services, which may only transport enterprise traffic whilst another tunnel may transport traffic which is subject to the network security service. For non enterprise services such as general internet traffic, an un-tunnelled path can be used.

Thus in the case of the enterprise traffic, normally when a tunnel such as VPN tunnel has been set up, all network traffic goes through the VPN tunnel. However the security agent of the invention can offload internet traffic to its internet destination and advantageously selectively steer only enterprise relevant traffic on the enterprise tunnel. At the same time the security agent can selectively steer traffic (for example suspicious traffic), towards the network security service on the network security service tunnel. Thus as illustrated in this embodiment in FIG. 1b, the security agent on the end-point device steers the bulk of the traffic to the Internet on capacious communication channels or pipes, and only the traffic that is of interest to the service, in this embodiment the security service is steered towards the service, with attendant benefits of minimising resources such as CPU and bandwidth required at the service. The device can make steering decisions about traffic dynamically either in response to traffic type, originating application, general security threat levels prevalent at the time or other factors.

Thus in the case of routing based on application, in order to detect which application has originated the connection, in the case of TCP, the device's operating system is interrogated for the current list of connections in the SYN_SENT state when a TCP SYN is detected, and before that TCP SYN is forwarded via the gateway (preventing any race condition and allowing tunnelling of the entire flow). The SYN packet is correlated with the originating process/application by matching the five tuple of the flow.

In the case of malware, the network security service can push application policies which determine where traffic for particular applications is steered or whether traffic for one or more applications is blocked on a device. In the case of malware this advantageously allows traffic from a suspected malware application or rogue application, to be analysed in more detail by the network security service through steering of traffic towards the network security service, or blocking such traffic on the device.

Figure 1C:
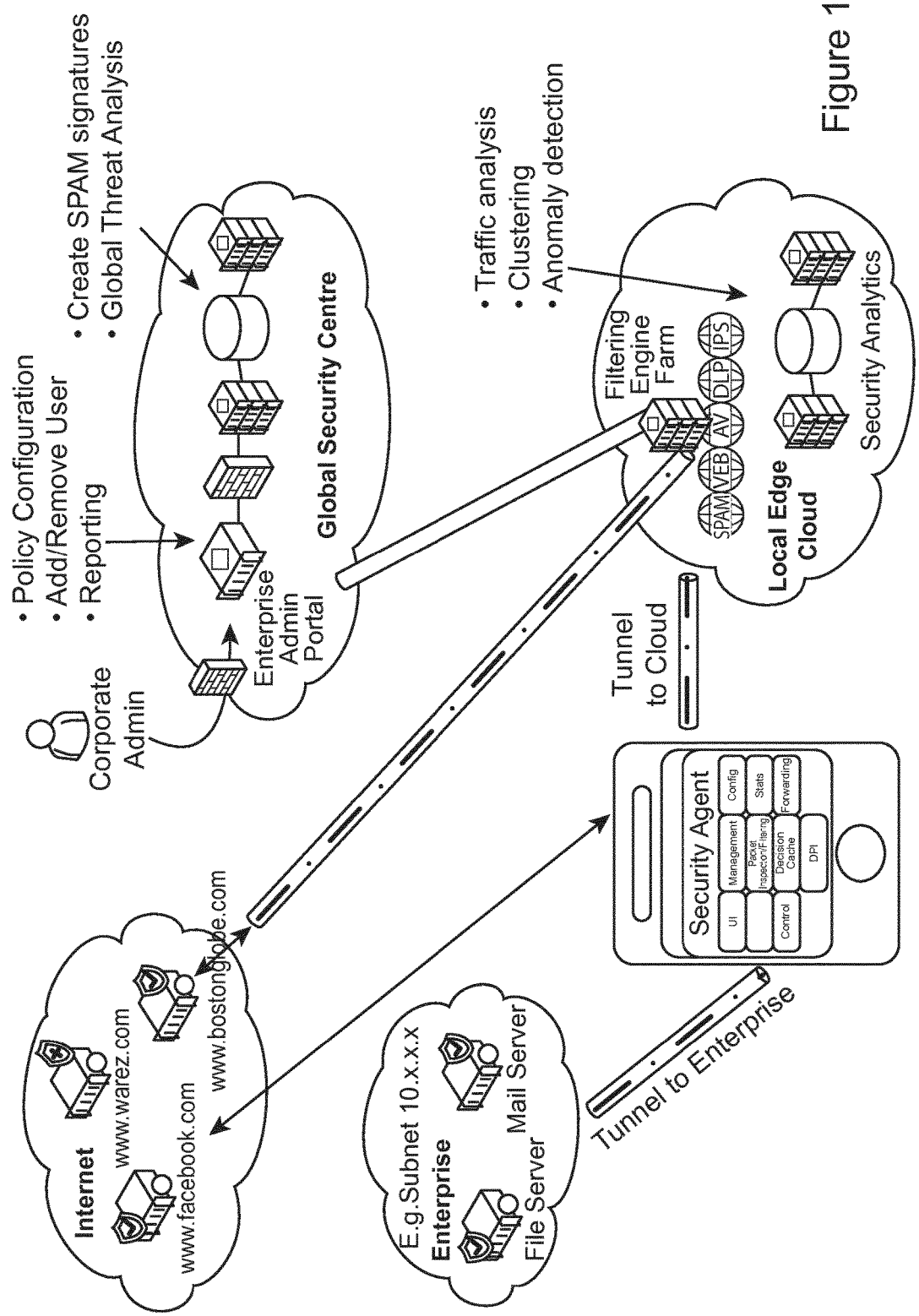
FIG. 1c illustrates in more detail a network environment in which a network security service according to the invention embodied as a cloud based system may operate and communicates with one or more devices containing a security agent according to the invention.

FIG. 1c illustrates in more detail a network environment in which a network security service according to the invention embodied as a cloud hosted system may operate and communicates with one or more devices containing a security agent according to the invention;

The network security service according to the invention can be embodied as a security analytics system/module and filtering engine farm.

The network security service of the invention can be embodied as a cloud based filtering and analytics platform including being embodied as a local edge cloud based filtering and analytics platform. A local edge cloud can be a geographically local cloud, for example it could be in a particular region or national area etc., with the system ensuring that the available local edge cloud which hosts the network security service that the security agent on the device communicates with, is most conveniently geographically located as possible. Note in other embodiments the network security service could be for example an in-network solution hosted within an operator's network infrastructure or a hosted solution within a vendor's own network infrastructure, or a hosted Enterprise solution.

The network security service can embody a global security centre (which can be hosted on a cloud) in conjunction with a cloud and analytics based filtering platform. In an alternative embodiment the network security service can be independent of the global security centre. A global security centre (such as for example the Adaptive Mobile Security (AMS) global security centre) hosts centralized global security functionality such as for example User Administration, global threat analysis, security threat control such as IP malware signatures.

Advantageously the network security service has access to very comprehensive information via the global security centre, i.e. has visibility of security threats that happen in many different types of networks including enterprise and operator (both fixed and mobile) networks, i.e. it has a holistic view of security threats and on detection can apply dynamic control and remediation methods as described above which are applicable to many different types of networks including enterprise and operator (both fixed and mobile) networks.

The network security service can have varied and alternative embodiments. It can be embodied in a filtering and security analytics platform hosted on a cloud and have means to accept security updates such as IP malware signatures or spam signature updates from a global security centre for example IP malware filtering or for SMS spam filtering.

The network security service can be termed a Network Protection Platform (NPP) such as that provided by Adaptive Mobile Security (AMS), in which the system according to the invention may be embodied. In an alternative embodiment the network security service can be independent of the NPP.

The security agent has the ability (which can be implemented via DPI capability/mechanisms on the device, including protocol identification and inspection capability), to generate, supplement and export or send network flow records/statistics (which in one embodiment are aggregated but in alternative embodiments need not be), for example network flow records incorporating statistics (such as for example IP traffic statistics) to the network security service. Thus for example the security agent can generate statistics for traffic to or from the device and export or send those statistics for example as network flow records (in one embodiment for example generating and exporting statistics as netflow records). The security agent can also for example supplement such records or generate additional informational records by for example generating additional device and traffic related information available to the security agent (for example in one embodiment augmenting the netflow records incorporating statistics and/or by generating additional informational records), which the security agent generates and exports or uploads or sends (which can be periodically) to the network security service, with for example information (including recording and/or identifying information) such as protocol type, device ID, application or process (for example that generated the traffic on which the statistics are based) or for example with information from standards such as W3C (in other embodiments could be the same or different information in alternative formats including proprietary formats) extended log file format fields for Web server log files with such information as URL requested on a particular session, URL download size, timestamp etc. In the case of protocol identification, the security agent can block data on certain protocols, resulting in some channels being more secure than others. Thus realising policies where certain protocols are only permissible on certain networks, for example non corporate networks. Data can also be steered by the security agent on the device based on protocol, application or process.

In one embodiment the security agent is a netflow generator or exporter, and the network security service is a netflow collector (Netflow is a known network protocol developed by CISCO for describing IP flows in a network, including how to generate and export records/statistics for IP traffic or information (and on the receiving side) for collecting such records/statistics), although in other embodiments the security agent and network security service can support other protocols besides netflow, using for example IPFix (the IETF Internet Protocol Flow Information Export protocol) or sflow (an industry standard technology developed by InMon and now under the auspices of the sFlow.org industry consortium who are focused on promoting and further technical development of the technology), etc.), or alternatively for example sending the records/statistics in an alternative protocol over for example a TCP/IP interface, or using other protocols including proprietary protocols or other means etc, for all traffic (including bypassed flows, refer to FIG. 8 and associated description), which in one embodiment are periodically uploaded to the network security service. In order to have visibility of all traffic (and produce network flow records/statistics (for example netflow records/statistics)) the security agent on the device needs to have access to raw packets, from at least layer 3. Advantageously as already described, the security agent on the device as well as generating standard network flow records/statistics for example network flow records incorporating statistics, is capable of supplementing the network flow records/statistics (which in one embodiment are aggregated but in alternative embodiments need not be), by generating additional statistics or information and/or by generating additional informational records (for example augmenting netflow records/statistics by generating additional statistics or information and/or additional informational records).

In more detail as illustrated in FIG. 1c, a security agent (of the invention) on a device is in communication with a network security service (of the invention), an enterprise network, and the internet. In the case of each of the enterprise network and the network security service, the invention provides means for such communication to be over a dedicated secure control and communication channel, each of which in one embodiment can be a VPN tunnel. Thus the security agent on the device can have multiple tunnels which may be designated for different services. The invention supports multiple VPN technologies such as for example SSH, PPTP, L2TP, L2TP/IPSec etc. In one embodiment on an Android (Linux based OS) device, a VPN service is defined on the device and a virtual network device TUN (available in/dev/tun) is used for this purpose. Alternative embodiments can be based on for example netfilter (on Linux without a TUN) or include using TUN on Linux (which is not necessarily part of a VPN), etc. In other embodiments the above functionality could be realised for example via the security agent being embodied or partly embodied as a kernel module, or alternative OS module, or alternative software means.

The network security service (in one embodiment the security analytics system/module) performs analysis of the uploaded network flow records/statistics. In one embodiment such analysis can be performed offline. In alternative embodiments such analysis need not be performed offline, for example network flow records/statistics could be uploaded and analysed in real or near real time, etc.

Based on such analysis, a control message(s) can be originated from the network security service to the security agent on the device to perform control measures such as dynamic intelligent targeted traffic steering (for example traffic can be steered from the security agent to the network security service) and/or communications/traffic blocking.

The network security service has means to push one or more rules or rule sets to a device (over the secure control and communication channel, e.g. VPN tunnel) as a control message(s) to the security agent on the device.

Such control messages/instructions/rule(s)/rule set(s) can specify for example what information/call flows that the security agent on the device should communicate to/tunnel to the network security service. Such instructions can also specify control actions such as for example blocking enterprise traffic and/or internet traffic to/from the device, or for example blocking traffic for a particular user device for a particular service, or on a particular session etc, whilst allowing other traffic.

In one embodiment such rule(s) or rule set(s) are associated with one or more policies associated with the subscriber. In alternative embodiments, based on observed behaviour of the subscriber device by the network security service (for example the security analytics system/module and/or the filtering module, of the network security service), such rules/rule sets can be pushed as control message(s) by the network security service to the security agent on the device independently of and without requiring subscriber policies to be provisioned.

The invention provides means for administrators such as for example a corporate/enterprise administrator to configure rule sets including policy based rule sets, associated with users which belong to their particular enterprise.

In FIG. 1c this is shown as a corporate administrator performing policy configuration for users via the enterprise administration portal to the global security centre. In other embodiments an operator (such as a mobile or fixed telecom operator) could perform such administration for its subscribers. The subscriber is provisioned with one or more unique identifier(s) which may be, but not limited to a subscriber identifier such as a MSISDN (Mobile Subscriber ISDN Number), MDN (Mobile Directory Number), MIN (Mobile Identification Number), IMSI (International Mobile Subscriber Identity), or a device identifier such as an IMEI (International Mobile Equipment Identity), ESN (Electronic Serial Number is a device identifier pertaining to the CDMA family of standards/technologies), or MEID (Mobile Equipment Identifier, which is replacing ESN), etc.

Also based on identification information which is available (for example provisioned) the network service of the invention can endeavour to discover other identification information by communicating with one or more operator network elements such as an operator's HLR to lookup identification information such as the IMSI, ESN, MEID, etc.

Thus policies can be defined and subscribers assigned to such policies.

Advantageously subscribers can be dynamically assigned to such policies based on user behavioural analysis and/or filtering by the network security service (for example the security analytics system/module and/or the filtering module, of the network security service) of the invention. When a subscriber is assigned to a policy, the policy based rule sets that need to be communicated to the security agent on the device such as dynamic traffic steering and/or other dynamic control means such as appropriate and targeted security defensive measures such as communications/traffic blocking, are pushed as a control message(s) to the security agent on the device.

The network security service (for example the security analytics system/module) of the invention tracks/monitors and analyses the communicated/tunnelled data (for example network flow records/statistics and/or traffic etc.) from many devices and baselines such group behaviour/communication patterns which correspond to normal characteristic patterns associated with device activity and can also baseline recurring group behaviour/communication patterns which correspond to out of the ordinary characteristic patterns associated with device activity. Device activity encompasses communications both to and from devices. The network security service can persist (for example in one or more database(s) or by other persistent means) such baselines of behavioural patterns advantageously enabling such patterns to be used as control signature patterns for detecting other devices exhibiting the same behavioural patterns.

Thus by monitoring, analysing, filtering, baselining and persisting traffic patterns, the invention can detect normal traffic characteristic patterns for a device and can detect out of the ordinary communication patterns to and from a device and establish whether the out of the ordinary communication poses a security or other threat or signifies malicious activity such as exhibiting known malware traffic patterns or behaviour, for example such as those associated with suspected malware infection and further has means for applying dynamic control means such as dynamic traffic steering and/or other dynamic control means such as appropriate and targeted security defensive measures such as communications/traffic blocking, by pushing rule(s)/rule set(s) as a control message(s) to the security agent on the device.

Subscribers whose device activity, the network security service ascertains as matching normal characteristic patterns can be assigned a policy configured for such purpose. Thus for example, such a user is assigned to a policy defined such that the policy rule set when pushed as a control message(s) to the security agent on the device, results in none of the user device's traffic being steered to the network security service (for example all of that user device's internet traffic is whitelisted).

Subscribers can initially/by default be assigned to a policy defined such that the policy rule set when pushed as a control message(s) to the security agent on the device, results in all his device internet network traffic being sent to the network security service, and only based on network security service analysis of user behaviour over time and no anomalies being detected is the user dynamically moved to a policy defined such that the policy rule set when pushed as a control message(s) to the security agent on the device, results in none of his internet traffic being sent to the network security service.

Subscribers whose device activity, the network security service ascertains (from for example network flow records/statistics analysis and/or traffic etc.) as matching known out of the ordinary characteristic patterns, for example known anomalies in subscriber behaviour, or known anomalies with respect to group behaviour or known suspicious behaviour patterns which for example pose a security or other threat or signifies malicious or undesirable/inappropriate activity, can be assigned a policy configured for such purpose. Such known behaviour could for example be group behaviour such as one or more users having visited a web site and their device(s) having become infected. The network security service can persist such behavioural patterns and on detection of another user device manifesting the same behaviour can deduce that the same outcome may occur, i.e. if another user device visits that website it may have become infected. Thus for example such a user is dynamically assigned to a policy defined such that the policy rule set, when pushed as a control message(s) to the security agent on the device, results in all of a user device's traffic being blocked.

In one embodiment the network security service employs measures of statistical similarity of behavioural patterns such as for example entropy and spectral analysis, which are used to derive a score which represents the probability of matching or equivalently the degree of similarity to a certain known pattern, on which a threshold can be defined to determine whether the observed behaviour from a subscriber device matches the known pattern (the known pattern(s) can be a characteristic pattern(s) for ordinary or out of the ordinary recurring group behaviour/communication patterns).

Alternatively, such a user is assigned to a policy defined such that the policy rule set when pushed as a control message(s) to the security agent on the device, results in all of a user device's internet network traffic being steered via a dedicated VPN tunnel to the network security service where all such traffic can be filtered and analysed, and based on results of analysis of such behaviour and/or filtering, the status of a user could be dynamically changed, and such a subscriber could be dynamically or automatically moved to a policy defined such that the policy rule set, when pushed as a control message(s) to the security agent on the device, results in all of a user device's traffic being blocked by a security agent on the device.

Further on malware detection, for example in one embodiment a user is dynamically assigned to a policy defined such that the policy rule set, when pushed as a control message(s) to the security agent on the device, results in the user device being only able to download a malware remediation tool to cleanup the device after which normal network access can be restored by dynamically assigning a subscriber to a different policy and pushing a rule set to the device to reflect the new policy.

In one embodiment the security analytics module communicates with a policy management entity (which may or may not be embodied in a Network Protection Platform (NPP) such as that provided by Adaptive Mobile Security (AMS)) to dynamically or automatically move a subscriber to a different policy based on behavioural analysis.

Advantageously, by enabling the steering of traffic (to the network security service) coupled with sending or upload of the network flow records/statistics which can be aggregated (for a subscriber's device to the network security service), the network security service (in one embodiment the security analytics system/module and/or the filtering module) has the means to analyse and filter whatever communications information is available from a device (for example allows combining analysis of network flow records/statistics and/or filtering and analysis of network traffic etc.), and based on such analysis and filtering perform control communications to the security agent to perform control measures such as targeted traffic steering and/or communications/traffic blocking, diverting etc.

Thus for example analysis of network flow records/statistics could reveal large data downloads on the VPN tunnel from the corporate network, whilst analysis of actual traffic on a different channel such as a device's internet traffic could show subsequent large data uploads being uploaded to the Internet.

Coupling the analysis enables detection of such suspicious (or suspected suspicious) activity, as in above example detecting violation of a corporate entities policy, as regards corporate data being removed from the corporate network (data loss prevention).

Rules or rule based policies based on such analysis being pushed by the network security service to the security agent can advantageously lead to data loss prevention.

Advantageously the filtering module can pass steered network traffic to the security analytics system/module for analysis. In such instances the filtering module can provide contextual information which it has such as the device identifier etc to the security analytics system/module. Thus on detection of suspicious behaviour the security analytics module has the device ID for the associated subscriber device available to it and the network security service can target that device with a control message(s) to the security agent on the device to perform dynamic control measures such as dynamic intelligent targeted traffic steering for example communications/traffic blocking etc.

Such anomalies as for example privacy violations, for example suspicious uploads of suspected privacy data (i.e. data leakage/data loss) either knowingly or unknowingly from a subscriber device to an entity outside the corporate network (e.g. a server on the Internet), can be detected in one embodiment by analysis of just the steered internet traffic by the network security service, and in an alternative embodiment by analysing both steered internet traffic and network flow records/statistics by the network security service. It will be appreciated that the invention can analyse traffic that is steered to it, and/or network flow records/statistics and/or network event records/statistics either in any combination or in isolation.

Such analysis can be very powerful in the context of policy management/enforcement in the context of Bring Your Own Device (BYOD) which many corporates are increasingly allowing their employees to do.

Subscribers whose device activity, the network security service ascertains as diverging from normal behaviour such as suspicious or suspected suspicious behaviour, but does not have known specific characteristic patterns, can be assigned a policy configured for such purpose. Such behaviour could for example, be visiting a web site/connecting to an IP address that has not been detected before, which could be suspected inappropriate browsing activity observed on Internet traffic, or unusual servers being contacted, for example connecting to foreign servers which do not have well known services, which could be a manifestation of a new threat(s). Thus for example, such a user is assigned to a policy defined such that the policy rule set when pushed as a control message(s) to the security agent on the device, results in all of a user device's internet network traffic being steered via a dedicated VPN tunnel to the network security service where all such traffic can be filtered and analysed.

Advantageously the security agent always generates network flow records/statistics (which can be aggregated) for a subscriber's device and these are sent to the network security service via the VPN tunnel for analysis.

A Subscriber device's activity/traffic patterns are stored on the system by persistent means, for example in one or more database(s) or by other persistent means.

Subscribers build up a history based on their device activity over time and subscriber propensity to exhibit suspicious or normal behaviour in the past influences which policy they have assigned to them. The system ensures that behavioural changes result in users moving policies based on analysis of such behavioural changes.

Figure 2:
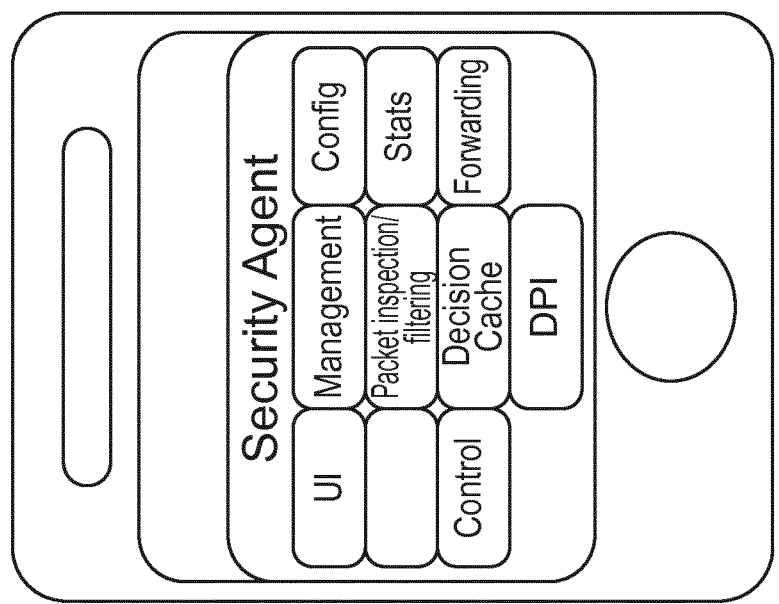
FIG. 2 illustrates a security agent adapted to be configured on a user device according to one aspect of the invention.

Referring to FIG. 2, the network security service in one embodiment the filtering engine farm/module of the network security service (in an alternative embodiment the filtering engine farm/module and/or the security analytics system/module of the network security service) has very powerful dynamic security threat detection, mitigation and control, and can be applied to many security threats including intrusion prevention, data loss prevention, anti-virus, botnet attacks, Multi bearer filtering (such as Web, SMTP, MMS, SMS etc), anti-spam, etc.

Referring to the security agent on the user device, some of the functional features/modules are depicted in FIG. 2 and described below.

The security agent has DPI capability (including protocol identification and inspection capability) on the device, being capable for example of supplementing the network flow records/statistics (which can be aggregated), for example augmenting the netflow statistics by generating additional informational records, which it generates (and in one embodiment can periodically upload to the network security service) with for example information (including recording and/or identifying information) such as protocol type, application or process (that generated the traffic on which the statistics are based) or for example with information from standards such as W3C (in other embodiments could be alternative formats including proprietary formats) extended log file format fields for Web server log files with such information as URL requested on a particular session, URL download size, timestamp etc. Refer to the previous description of the security agent and generation of network flow records/statistics for further detail.

The security agent has Control functionality being capable of receiving and executing instructions from the network security service as to which flows to send to where.

Figure 9:
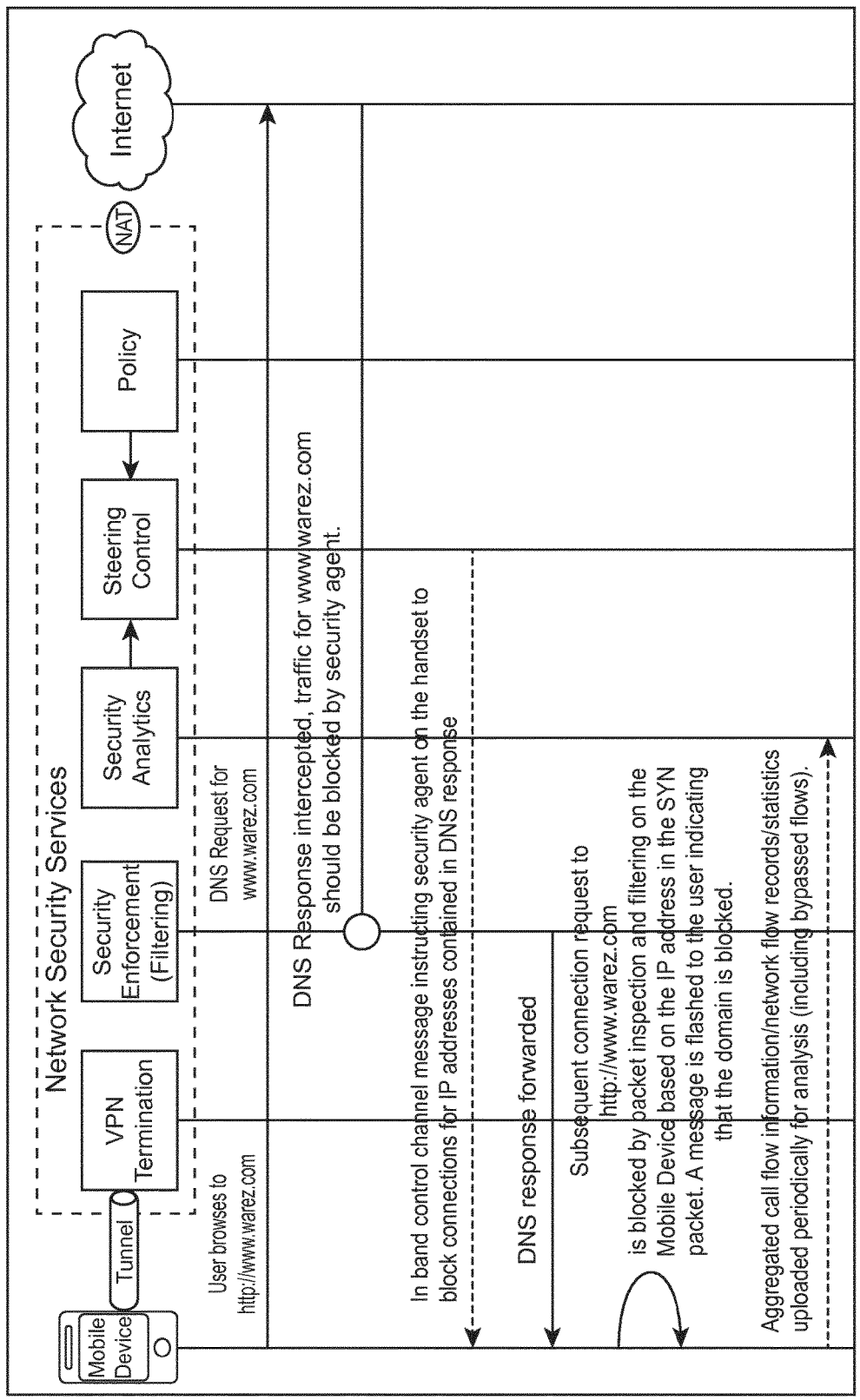
FIG. 9 illustrates how the invention can be applied to domain filtering.

The security agent's decision cache enables the security agent to cache control information/rules (which are generally based on control message(s)/command(s) received from the network security service but need not be), upon which it can determine the control measures such as targeted traffic steering or appropriate security defensive measures (such as for example means to block such communications/traffic) to perform/apply. For example a blocking rule can be defined in the cache allowing blocking functionality to be implemented. A further example could be a rule to always bypass the network security service for a particular IP address(es). Refer to FIG. 9 and associated description for an example of domain filtering on the device using the security agent's decision cache.

The security agent has forwarding functionality which enables the security agent to route packets for example to various tunnels (for example to an enterprise tunnel, to steer packets to the network security service tunnel etc.).

As well as the network security service of the invention having means to perform packet inspection and filtering, the security agent of the invention has means to perform packet inspection and filtering on the device, refer to FIG. 9.

The security agent configuration module allows pre-configuration for automatic tunnel setup. The security agent management module performs management activities such as for example management of the VPN connection, for example managing re-establishment of the VPN connection, for example if the device IP address changes from WiFi to Mobile, or for example if the device roamed from a 2G mobile network to a 3G mobile network.

The security agent can be preloaded on the device before it is commissioned, or can be made available for download on the operators web site or via an application store. Once the security agent is installed on the device, the device can be notified for example by the application store (or the network security service) when updates such as security agent updates are available or downloaded and ready to be installed etc. Alternatively the security agent can for example poll the network security service, to ensure that it detects that updates, such as updates of the security agent are available and can download such updates.

The security agent can ascertain one or more unique identifier(s) from the device which may be, but not limited to a subscriber identifier such as a MSISDN (Mobile Subscriber ISDN Number), MDN (Mobile Directory Number), IMSI (International Mobile Subscriber Identity), or a device identifier such as an IMEI (International Mobile Equipment Identity), ESN (Electronic Serial Number is a device identifier pertaining to the CDMA family of standards/technologies), or MEID (Mobile Equipment Identifier, which is replacing ESN), etc. and populate one or more of these in the device ID which is passed to the network security service.

A secure control and communication channel, in this embodiment a VPN tunnel is required for traffic upload, however it should be noted that the network flow records/statistics which can be aggregated, (for example netflow records/statistics) could be uploaded by the security agent to the network security service without or independently of a VPN tunnel, via for example a communication mechanism which can be web service based, or other TCP/IP based communication or other means.

The following are non-limiting flows which are provided to clarify some advantageous aspects of the invention.

In the following figures an authenticated and optionally encrypted VPN tunnel from the mobile device to the network security service is setup.

Figure 3:
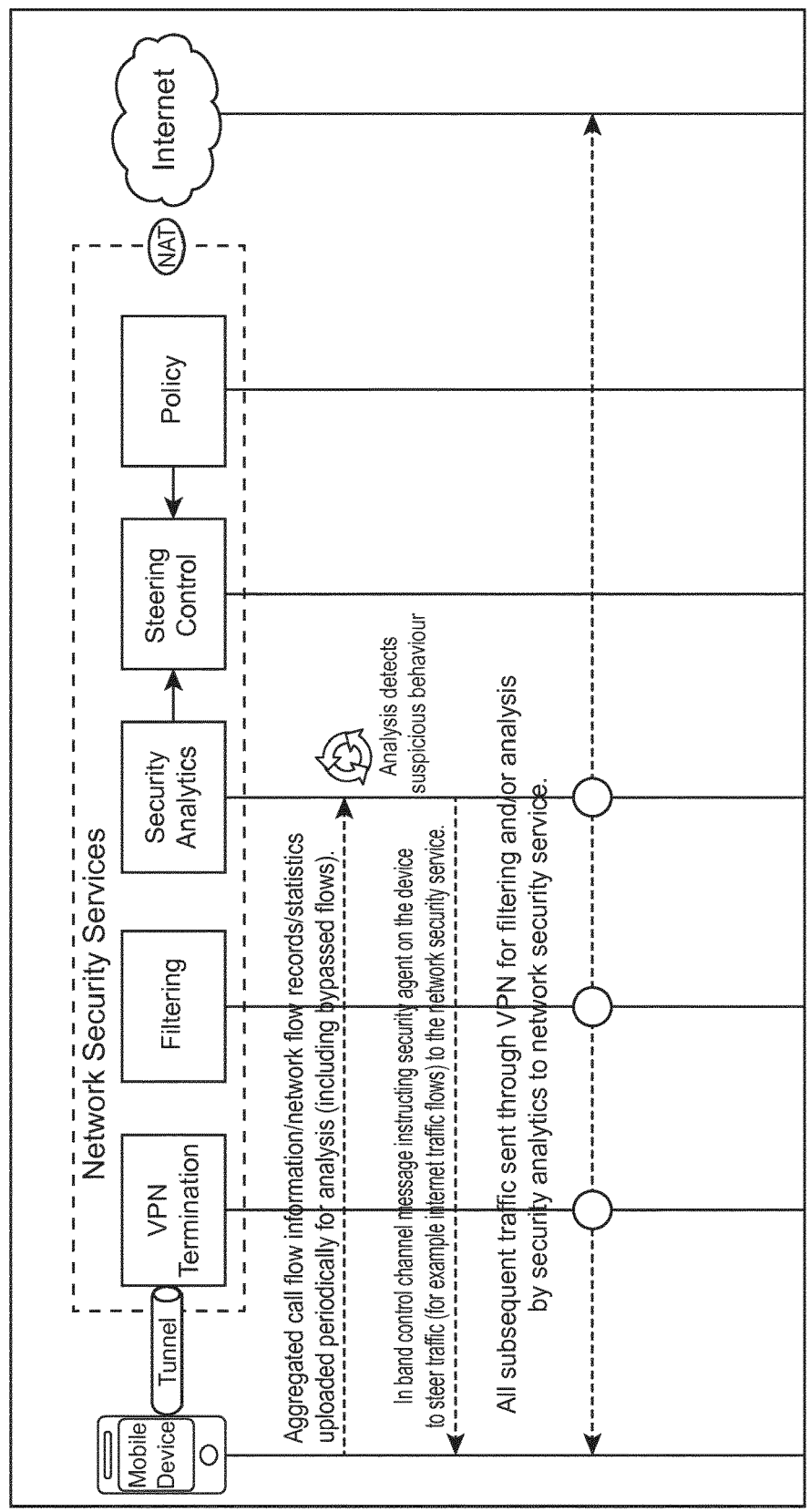
FIG. 3 illustrates a sequence diagram at the beginning of which a subscriber's traffic is not being uploaded to the network security service of the invention, however subsequently an in band control message is sent to the security agent on the device (which has been detected exhibiting suspicious behaviour), instructing it to steer traffic (for example internet traffic flows) to the network security service.

At the beginning of the sequence diagram illustrated in FIG. 3 as per the default action as configured on the security agent of the device in this instance, the subscriber's traffic is not being uploaded to the network security service of the invention. The network security service analyses the network flow records/statistics (for example netflow records/statistics) for all traffic. Advantageously as already mentioned the security agent has DPI capability on the device, being capable of supplementing the network flow records/statistics (for example netflow statistics) with for example protocol type, etc. A unique device ID can be determined by the security agent readily from device hardware attributes or other means. Thus on detection of suspicious behaviour the security analytics module has the device ID for the associated subscriber device available to it.

An in band control message triggered by analysis of network flow records/statistics, is originated by the steering control module of the invention and sent to the security agent on the particular mobile device which has been detected exhibiting suspicious behaviour, instructing it to steer traffic (for example internet traffic flows) to the network security service.

Based on the instruction contained in the control message all subsequent flows are steered from the device to the network security service via a VPN tunnel in this embodiment.

In one embodiment, based on observed behaviour of the subscriber device by the network security service (for example analysis by the security analytics system/module and/or filtering by the filtering module, of the network security service), such dynamic traffic steering can be achieved by rules/rule sets being pushed as control message(s) by the network security service to the security agent on the device independently of and without requiring subscriber policies to be provisioned.

In an alternative embodiment the security analytics module communicates with a policy management entity (which can be embodied in a Network Protection Platform (NPP) such as that provided by Adaptive Mobile Security (AMS)) to dynamically or automatically move a subscriber based on behavioural analysis to a different policy, defined such that the policy rule set when pushed as a control message(s) to the security agent on the device, results in subscriber device traffic being intelligently steered (for example internet traffic flows) via a dedicated VPN tunnel to the network security service where all such traffic can be filtered and analysed.

In an alternative embodiment (not depicted in FIG. 3) an in-band control message is sent to the security agent on the particular mobile device which has been detected exhibiting suspicious behaviour, instructing it to steer traffic (for example internet traffic flows) on a sampled basis (for example based on volume, time etc) to the network security service.

Figure 4:
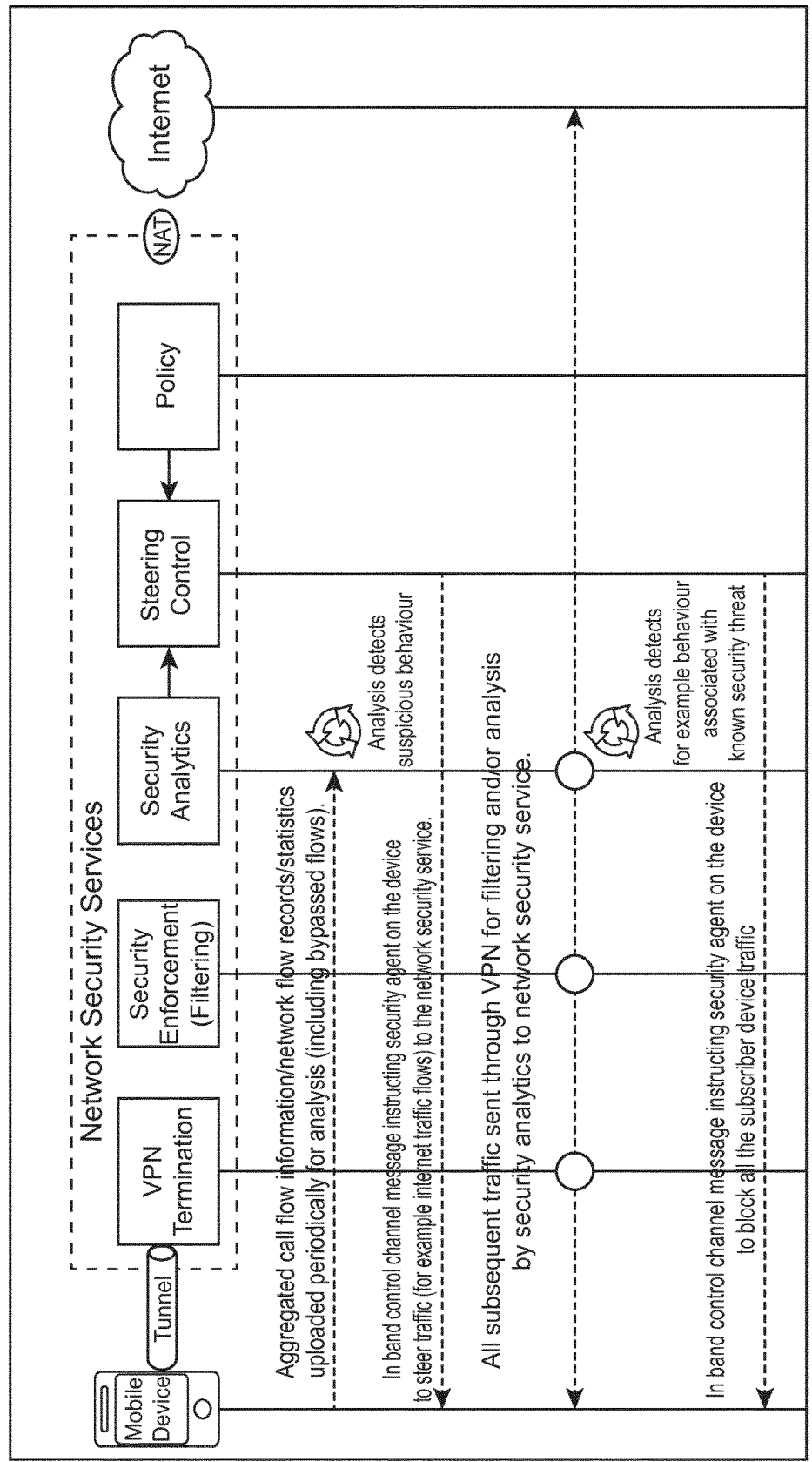
FIG. 4 illustrates a sequence diagram at the beginning of which a subscriber's traffic is not being uploaded to the network security service of the invention, however subsequently an in band control message is sent to the security agent on the device (which has been detected exhibiting suspicious behaviour), instructing it to steer traffic (for example internet traffic flows) to the network security service. Subsequently, further analysis by the network security service detects for example behaviour associated with a known security threat, and a further in band control message is sent to the security agent on the device instructing it to block all the subscriber device traffic.

At the beginning of the sequence diagram depicted in FIG. 4, as per the default action as configured on the security agent of the device in this instance, the subscriber's traffic is not being uploaded to the network security service of the invention.

The network security service analyses the network flow records/statistics (for example netflow records/statistics) for all traffic. Advantageously as already mentioned the security agent has DPI capability on the device, being capable for example of supplementing the network flow records/statistics (for example augmenting the netflow statistics by generating additional informational records) with for example information such as protocol type, etc. A unique device ID can be determined by the security agent readily from device hardware attributes or other means. Thus on detection of suspicious behaviour the security analytics module has the device ID for the associated subscriber device available to it.

An in band control message is sent to the security agent on the particular mobile device which has been detected exhibiting suspicious behaviour, instructing it to steer traffic (for example internet traffic flows) to the network security service.

In one embodiment, based on observed behaviour of the subscriber device by the network security service (for example analysis by the security analytics system/module and/or filtering by the filtering module, of the network security service), such dynamic traffic steering can be achieved by rules/rule sets being pushed as control message(s) by the network security service to the security agent on the device independently of and without requiring subscriber policies to be provisioned.

Based on the instruction contained in the control message all subsequent flows are steered from the device to the network security service via a VPN tunnel in this embodiment.

In an alternative embodiment the security analytics module communicates with a policy management entity (which can for example be embodied in a Network Protection Platform (NPP) such as that provided by Adaptive Mobile Security (AMS)) to dynamically or automatically move a subscriber based on behavioural analysis to a different policy, defined such that the policy rule set when pushed as a control message(s) to the security agent on the device, results in subscriber device traffic being intelligently steered (for example internet traffic flows) via a dedicated VPN tunnel to the network security service where all such traffic can be filtered and analysed.

The network security service does further analysis on all communications information available from the device (in this instance network flow records/statistics and traffic) and detects behaviour associated with known security threat(s).

An in band control message is sent to the security agent on the particular mobile device, instructing it to block all the subscriber device traffic. This can be selectively controlled on a per app level on the device, i.e. block all traffic for a particular application on the device whilst allowing traffic from other applications.

In one embodiment, such dynamic blocking can be achieved by rules/rule sets being pushed as control message(s) by the network security service to the security agent on the device independently of and without requiring subscriber policies to be provisioned, whilst in an alternative embodiment such dynamic blocking can be associated with a subscriber being dynamically or automatically moved to a policy defined such that the policy rule set, when pushed as a control message(s) to the security agent on the device, results in all of a user device's traffic being blocked.

As already stated the security agent on the device is capable of steering traffic based on for example protocol, application or process.

Figure 5:
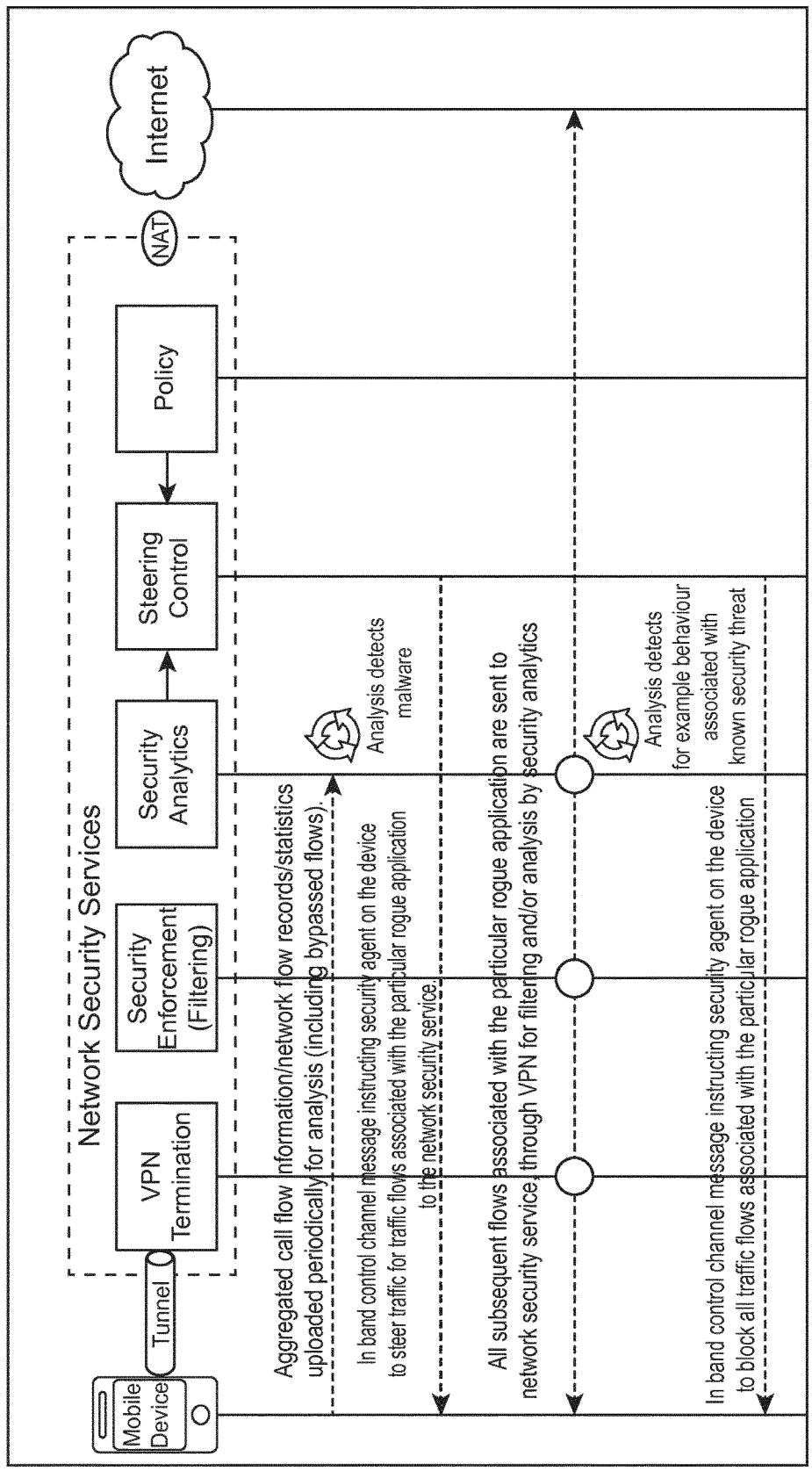
FIG. 5 illustrates traffic steering based on application, in this instance malware.

FIG. 5 illustrates traffic steering based on application, in this instance malware.

In this example the default action as configured on the security agent of the device, is not to upload traffic flows to the network security service. However network flow records/statistics are being uploaded from the security agent to the network security service.

The network security service analyses the network flow records/statistics (for example netflow records/statistics) for all traffic. Advantageously as already mentioned the security agent has DPI capability on the device, being capable for example of supplementing the network flow records/statistics (for example augmenting the netflow statistics by generating additional informational records) with for example information such as protocol type, etc. A unique device ID can be determined by the security agent readily from device hardware attributes or other means. Thus on detection of suspicious behaviour the security analytics module has the device ID for the associated subscriber device available to it.

Note that the description in FIG. 5 pertains to one rogue application, however the sequence flow illustrated is applicable to one or more rogue applications.

A rogue application can for example be a malicious application such as for example a Bot, a Trojan, Spyware, an app designed for fraud etc.

The network security service detects malware. An in band control message triggered for one or more previously detected known suspicious rogue application(s), originated by the steering control module of the invention is sent to at least one security agent on a mobile device, instructing it to steer all traffic flows associated with one or more known or suspected rogue application(s) to the network security service. Based on the instruction contained in the control message all subsequent flows for the one or more specified application(s) are steered from the device to the network security service via a VPN tunnel in this embodiment.

In one embodiment, based on observed behaviour of the subscriber device by the network security service (for example analysis by the security analytics system/module and/or filtering by the filtering module, of the network security service), such dynamic traffic steering can be achieved by rules/rule sets being pushed as control message(s) by the network security service to the security agent on the device independently of and without requiring subscriber policies to be provisioned.

In an alternative embodiment the security analytics module communicates with a policy management entity (which can for example be embodied in a Network Protection Platform (NPP) such as that provided by Adaptive Mobile Security (AMS)) to dynamically or automatically move a subscriber based on behavioural analysis to a different policy, defined such that the policy rule set when pushed as a control message(s) to the security agent on the device, results in subscriber device traffic being intelligently steered (for example internet traffic flows) via a dedicated VPN tunnel to the network security service where all such traffic can be filtered and analysed.

The network security service does further analysis on all communications information available from the application on the device (in this instance network flow records/statistics and traffic) and detects behaviour associated with known security threat(s).

An in band control message is sent to the security agent on the particular mobile device, instructing it to block all traffic for one or more particular application(s) on the subscriber device. This can be selectively controlled on a per app level on the device, i.e. block all traffic for one or more particular application(s) on the device whilst allowing traffic from other applications.

In one embodiment, such dynamic blocking can be achieved by rules/rule sets being pushed as control message(s) by the network security service to the security agent on the device independently of and without requiring subscriber policies to be provisioned, whilst in an alternative embodiment such dynamic blocking can be associated with a subscriber being dynamically or automatically moved to a policy defined such that the policy rule set, when pushed as a control message(s) to the security agent on the device, results in all of a user device's traffic for one or more particular application(s) being blocked, or alternatively the policy could result in all of a user device's traffic being blocked.

Further on malware detection, for example a user is dynamically assigned to a policy defined such that the policy rule set, when pushed as a control message(s) to the security agent on the device, results in the user device being only able to download a malware remediation tool to clean-up the device after which normal network access can be restored by dynamically assigning a subscriber to a different policy and pushing a rule set to the device to reflect the new policy.

Thus in the case of malware, the network security service can push application policies which determine where traffic for particular applications is steered or whether traffic for one or more applications is blocked on a device. In the case of malware this advantageously allows traffic from a suspected malware application to be analysed in more detail by the network security service through steering of traffic towards the network security service, or blocking such traffic on the device.

Advantageously the network security service could be based on the approach in the above flow, detect and mitigate a major security attack (for example a botnet attack).

Thus for example the security agent (and the network security service) have access to device identifiers, for example the IMSI from which it can ascertain the operator and country. In a further aspect, in the case of roaming, the security agent has access to device location (for example the device GPS co-ordinates if available, or it may be available from the device operating system or other means), and can upload the device location to the network security centre, for example by supplementing the network flow records/statistics which can be aggregated, (for example augmenting the netflow statistics by generating additional informational records) with location information such as GPS co-ordinates etc. In an alternative embodiment a "location update". in band control message is sent to the security agent on the particular mobile device, instructing it to provide a "location update", in response to which a "location update", is sent from the security agent to the network security service.

Advantageously utilizing location information the network security service can perform intelligent targeting of particular device(s) based on detection of for example suspicious traffic and/or suspicious behaviour and/or one or more security threat(s) from the device (s) and their location and/or for example in the case of a mobile operator whether such device(s) are roaming or not. Thus for example if there was suspicious traffic and/or suspicious behaviour and/or one or more security threat(s) detected from one or more devices, it might be decided to target such device(s) that are roaming first as such device(s) generate interconnect fees and are also causing issues not just for the network provider to whom they belong but also on the network on which they are roaming, i.e. home network subscriber devices causing problems on a foreign network. For messaging, an example of suspicious behaviour detected by the invention could include a suspicious application on a subscriber device that is generating SMS messages being sent to premium numbers (that the user may not be aware of) from both roaming subscribers and subscribers in the home network. In the case of IP an example of a security threat could be detection by the invention through IP analysis of a mobile distributed denial of service (DDOS) attack affecting both roaming subscribers and subscribers in the home network.

In one embodiment the network security service could for example detect a major security attack in an operator or all operators in a geographic region etc. and could send control messages to a large number of devices in those networks (effectively broadcast control messages) to for example effectively steer or block traffic.

In an alternative embodiment the network security service could selectively request all traffic from devices (that it is aware of which have the security agent installed) for a particular operator or geographic region (e.g. country) to be steered to the network security service, and could send further control messages to block selectively (for example corporate traffic or internet traffic in the clear) or all traffic for such devices for a particular operator or geographic region.

In one embodiment for example such major security incident(s) could be detected through messaging analysis for example SMS spam analysis by the invention. In an alternative embodiment such a major incident could be detected through IP analysis by the invention. In alternative embodiments such detection by the invention could be based on an analysis of alternative bearers. In yet alternative embodiments such detection by the invention could be based on an analysis of a combination of bearers (i.e. cross bearer analysis), for example a combination of IP analysis and messaging analysis (for example SMS spam analysis).

This approach is not limited to the above examples but can be applied by the invention to any suspicious traffic and/or suspicious behaviour and/or one or more security threat(s) or incidents etc. on one or more bearers etc. including traffic that is steered to the network security service, and/or network flow records/statistics and/or network event records/statistics sent to the network security service; analysed either in combination or in isolation.

As already stated the security agent on the device is capable of steering traffic based on for example device, service/application, protocol, session/flow.

Figure 6:
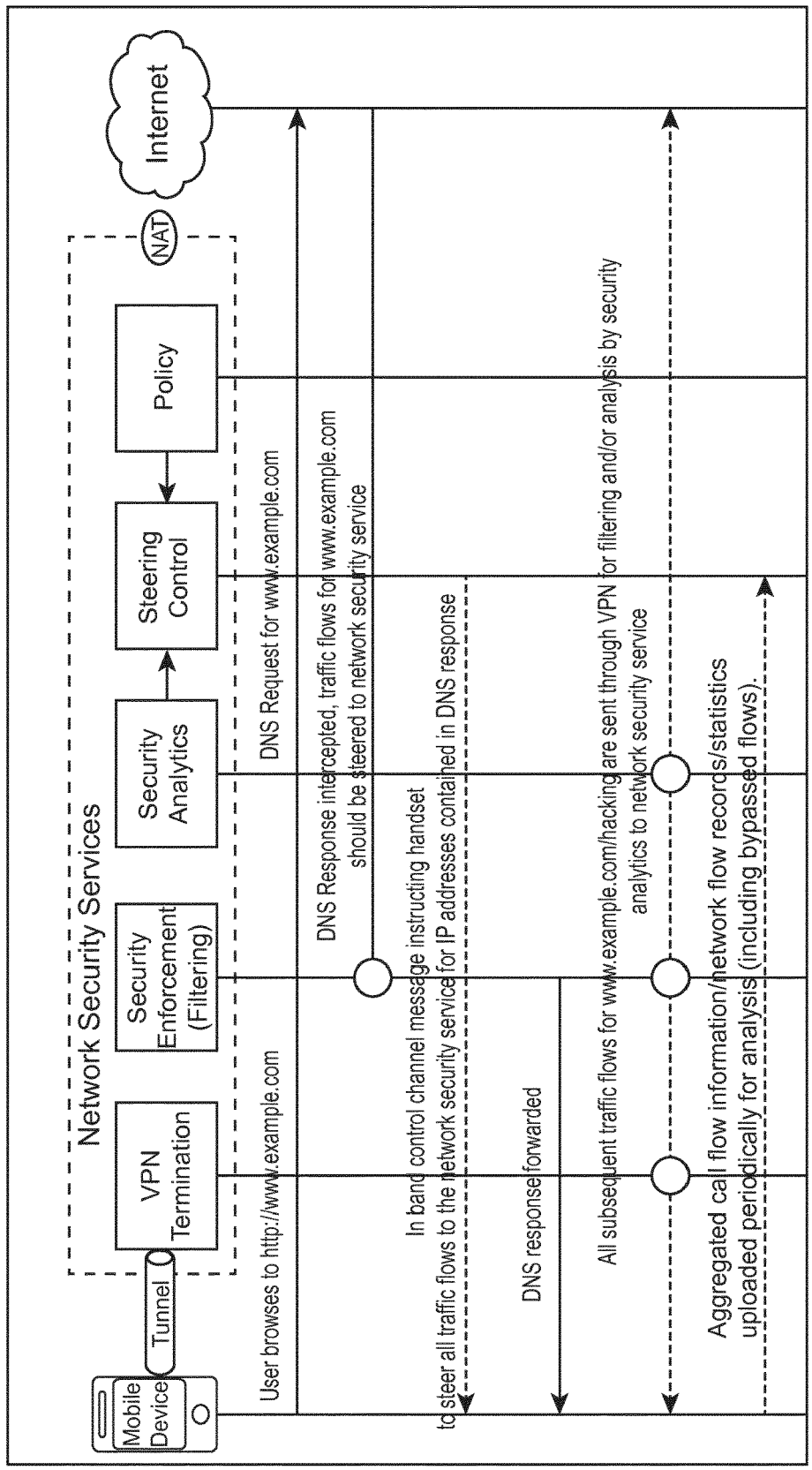
FIG. 6 illustrates traffic steering based on flow.

FIG. 6 illustrates traffic steering based on flow, using a HTTP URL Filtering use case. In this example the default action as configured on the security agent of the device, is not to upload traffic flows to the network security service. However network flow records/statistics are being uploaded from the security agent to the network security service.

The user enters for example http://www.example.com/hacking in their browser on the mobile device. The associated DNS request is tunnelled via the network security service to the Internet. An in band control message (in this example triggered by the inspection of the DNS response for the domain by the network security service), originated by the steering control module of the invention is sent to the security agent on the device, instructing the security agent on the device which originated the request to steer all traffic for that flow to the network security service.

Based on the instruction contained in the control message all subsequent flows for the specified IP addresses contained in the DNS response are steered from the device to the network security service via a VPN tunnel in this embodiment, and thus traffic for www.example.com is steered to the network security service.

Also illustrated is the fact that the security agent (on the mobile device according to the invention) generates network flow records/statistics which can be aggregated, (in one embodiment is a netflow exporter, although in other embodiments can support other protocols besides netflow, using for example IPFix (the IETF Internet Protocol Flow Information Export protocol) or sflow)) for all traffic (including bypassed flows, refer to FIG. 8 and associated description) which are periodically uploaded to the network security service.

The network security service (in one embodiment the security analytics system/module of the network security service) performs analysis of the uploaded network flow records/statistics. In one embodiment such analysis can be performed offline.

Figure 7:
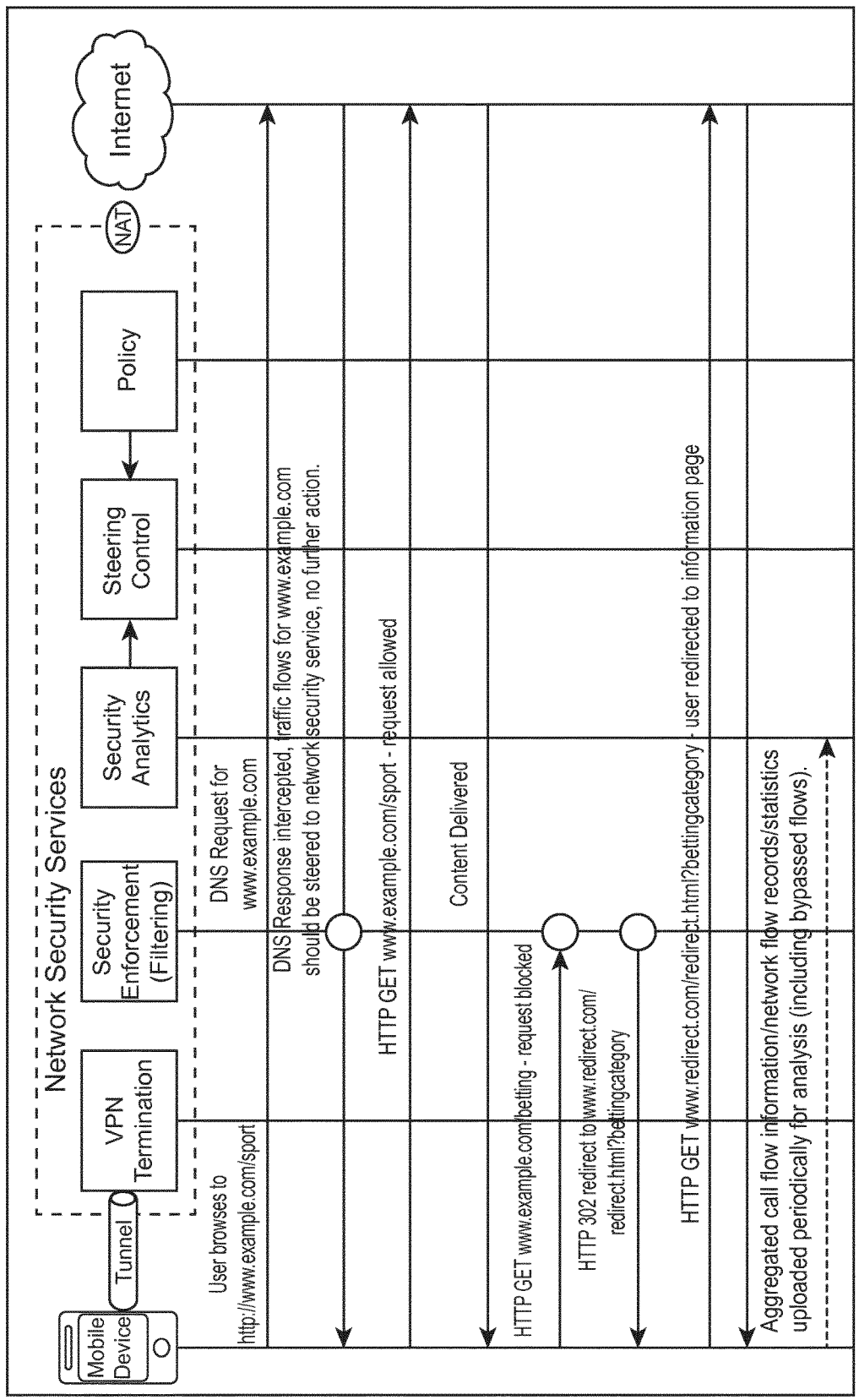
FIG. 7 illustrates HTTP URL Filtering according to one aspect of the invention.

FIG. 7 illustrates HTTP URL Filtering. In this example traffic flows are being steered to the network security service (as well as network flow records/statistics which can be aggregated) for subscribers. The user enters for example http://www.example.com/sport in their browser on the mobile device. The associated DNS request is tunnelled via the network security service to the Internet. The DNS response is inspected by the network security service, and no specific action is to be taken for this flow, and no control message is sent from the network security service to the security agent on the mobile device, and the default action as configured on the security agent of the device is taken which in this instance is to upload traffic to the network security service and thus traffic for www.example.com is steered to the network security service. In other embodiments the default action could be to bypass the network security service when no explicit control message is received by the security agent from the network security service.

The initial HTTP GET www.example.com/sport request is allowed with the content being delivered in the response to the mobile device user. In this embodiment a filtering Engine module in the network security service (in this embodiment the filtering module (which may or may not be embodied in a Network Protection Platform (NPP) such as that provided by Adaptive Mobile Security (AMS)) communicates with a URL categorisation network service entity (for example a URL/WEB content categorization service/database such as provided for example by RuleSpace) to ascertain if a HTTP GET request should be allowed or not.

In the case of the second HTTP GET request, URL filtering results in the request being blocked, and in this embodiment an example of intelligent dynamic redirection is illustrated with the communication being redirected to an informational Web page on the service requested (in this instance betting).

Also illustrated is the fact that the security agent (on the mobile device according to the invention) generates network flow records/statistics which can be aggregated, (in one embodiment is a netflow exporter, although in other embodiments can support other protocols besides netflow, using for example IPFix (the IETF Internet Protocol Flow Information Export protocol) or sflow)) for all traffic (including bypassed flows, refer to FIG. 8 and associated description) which are periodically uploaded to the network security service.

The network security service (in one embodiment the security analytics system/module of the network security service) performs analysis of the uploaded network flow records/statistics. In one embodiment such analysis can be performed offline.

Figure 8:
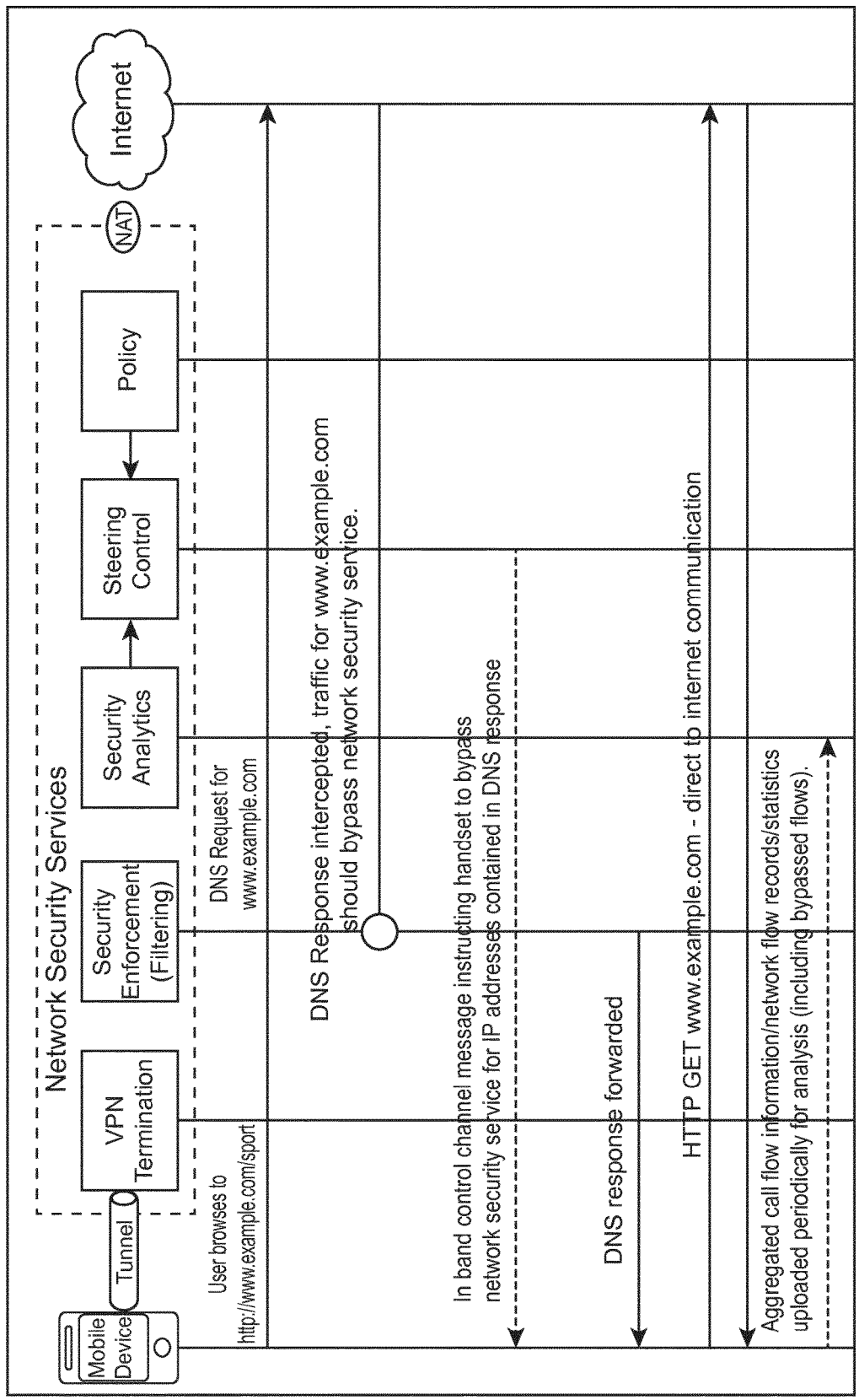
FIG. 8 illustrates HTTP URL Filtering according to one aspect of the invention.

FIG. 8 illustrates HTTP URL Filtering. The user enters for example http://www.example.com/sport in their browser on the mobile device. The associated DNS request is tunnelled via the network security service to the Internet.

The DNS response is intercepted and the filtering Engine module ascertains that this is a whitelisted domain and that no filtering is required of requests destined for this domain.

An in band control message is sent to the security agent on the mobile device instructing it to bypass the network security service for flows for IP addresses contained in the DNS response.

The DNS response is forwarded to the security agent on the mobile device. Subsequent requests to and responses from the whitelisted domain (e.g. HTTP Get www.example.com requests and responses) go direct to internet communication with such flows bypassing the network security service.

However even in the case where such bypassing takes place as shown the security agent (on the mobile device according to the invention) generates network flow records which can be aggregated (in one embodiment is a netflow exporter, although in other embodiments can support other protocols besides netflow, using for example IPFix (the IETF Internet Protocol Flow Information Export protocol) or sflow)) for all traffic (including bypassed flows) which are periodically uploaded to the network security service.

The network security service (in one embodiment the security analytics system/module of the network security service) performs analysis of the uploaded network flow records/statistics. In one embodiment such analysis can be performed offline.

FIG. 9 shows how the invention can be applied to domain Filtering. The user enters for example http://www.warez.com in their browser on the mobile device. The associated DNS request is tunnelled via the network security service to the Internet. The DNS response is intercepted and the filtering Engine module ascertains that this is a blacklisted domain and that connections for this domain should be blocked by the security agent.

An in band control message is sent to the security agent on the mobile device instructing it to block connections to IP addresses contained in the DNS response. The DNS response is forwarded to the security agent on the mobile device. The IP address(es) is cached in the security agent's decision cache. Subsequent connection requests to that IP address(es) are blocked by packet inspection/filtering on the Mobile Device based on the IP address in the SYN packet matching the IP address cached in the security agent's decision cache, with the connection being reset/terminated. A message is flashed to the user indicating that the domain is blocked (the user message could be implemented via an Android notification service).

The methods described in this invention apply not only to the HTTP protocol but advantageously work for any protocol that uses DNS to get a domain IP address, for example any messaging on an IP channel for example IM (including any proprietary Instant messaging protocol), SIP based messaging, push services (can be proprietary and also not limited to but including examples such as Apple Push Notification Service, Google Android Cloud to Device Messaging (C2DM) service etc.), Over The Top (OTT) messaging services/providers (such as Apple iMessage, BlackBerry Messenger, Whatsapp, Skype, Facebook Messenger, Google Talk, KakaoTalk, Viber, etc.) etc.

In alternative embodiments the security agent could perform further DPI on the device, for example packet inspection, determining what the protocol is and applying policy control on the device, for example if the policy did not allow gaming or peer to peer then the security agent could terminate the connection, and in one embodiment a message is flashed to the user indicating that a policy control violation has occurred.

Also illustrated is the fact that the security agent generates network flow records/statistics which can be aggregated (for example netflow records/statistics) for all traffic (including bypassed flows) which are periodically uploaded to the network security service (in one embodiment the security analytics system/module of the network security service), for analysis. In one embodiment such analysis can be performed offline.

Note in an alternative embodiment, the DNS response is intercepted by the network security service and the filtering Engine module ascertains that this is a blacklisted domain and that connections for this domain should be blocked. The network security service sends back a negative response to the subscriber device for the DNS request (for example indicating that the Domain does not exist) and IP addresses contained in the original DNS response are not passed to the device.

The security agent on a user device generates network event records/statistics for events pertaining to the user device, including messaging event records/statistics (including SMS event records/statistics), which are periodically uploaded to the network security service.

Thus in the case of SMS, the security agent generates statistics (in one embodiment in a proprietary event record format but can employ other appropriate means) for inbound and outbound SMS messages, which the security agent periodically sends or uploads to the network security service (in one embodiment the security analytics system/module), for analysis. The event record format contains for example such fields as the originating address, destination address, content length, URLs if present in content, etc.

The network security service performs analysis of the received network event records/statistics. In one embodiment such analysis can be performed offline. In alternative embodiments such analysis need not be performed offline, for example network event records/statistics could be uploaded and analysed in real or near real time, etc.

In the case where the security agent is also generating and uploading network flow records/statistics (for example netflow records/statistics), in one embodiment such records/statistics are uploaded separately from the event records/statistics (for example SMS event records/statistics) to the network security service (in one embodiment the security analytics system/module), for analysis. In one embodiment such analysis can be performed offline.

Advantageously where the network security service (in one embodiment the security analytics system/module), is receiving/collecting both network flow records/statistics and network event records/statistics, it can do cross bearer analysis, for example analyse statistics from packet switched traffic in conjunction with analysis of network event records/statistics (for example SMS traffic). Thus a particular URL could be detected in an SMS event record and the same URL could be detected in a network flow record associated with a HTTP session, etc. The network security service could then combine URL filtering with cross bearer analysis to determine that the URL is known to be associated with a Web Server which hosts malware. Further cross-analysis by the network security service of the uploaded network flow records/statistics (e.g netflow records/statistics) and event records/statistics could determine how widespread this multi-vector security attack is, how many subscribers were contacted, how many times the Web server was accessed, how many malware downloads etc. The network security service can thus detect multi-vector security attacks and via sending control messages/rules to the security agent(s) on the devices targeted by the security attack, apply security mitigation and control policies.

Based on such analysis, a control message(s) can be originated from the network security service to the security agent on the device In the case where the security agent is also generating and uploading network flow records/statistics (for example netflow records/statistics), in one embodiment such records/statistics are uploaded separately from the event records/statistics (for example SMS event records/statistics) to the network security service (in one embodiment the security analytics system/module), for analysis. In one embodiment such analysis can be performed offline.

Although not depicted in this example traffic flows can be sent to the network security service (as well as network flow records/statistics and SMS event records/statistics which can be aggregated) for a subscriber on the same tunnel.

In an alternative embodiment the invention can complement the functionality already outlined with the means to analyse whatever communications information is available from the network (for example network flow records/statistics and/or traffic etc.) and based on such analysis perform control communications, enabling dynamic network traffic steering and other dynamic control means such as appropriate security defensive measures such as means to block or redirect such communications/traffic for network communications/traffic.

The network security service of the invention can collect network flow records/statistics such as netflow records/statistics (in one embodiment is a netflow collector), from network flow records/statistics exporters (for example netflow exporters), which include for example network elements such as network routers, network switches etc which are generating such network flow records/statistics.

In other embodiments the network security service can support the collection of such records/statistics from other protocols besides netflow, for example IPFix or sflow etc. The network security service performs analysis of these network flow records/statistics (for example netflow records/statistics). Based on such analysis, a control message(s) can be originated from the network security service.

It will be appreciated that the network security system and method of the invention as hereinbefore described can be applied any data traffic that can undergo traffic steering in a network.

Advantageously the invention enables traffic steering in data centre environments, mobile networks, fixed network, enterprise networks etc.

Advantageously the invention enables inspection of all packet formats for filtering, analysis and control including dynamic traffic steering and applying appropriate security defensive measures such as for example means to block or redirect such communications/traffic in data centre environments, mobile networks, fixed networks, enterprise networks, or any combination thereof etc.

The invention includes all types of messaging communications within scope. The invention applies to any messaging on an IP channel for example IM (including any proprietary Instant messaging protocol, SIP based messaging, push services (can be proprietary and also not limited to but including examples such as Apple Push Notification Service, Google Android Cloud to Device Messaging (C2DM) service etc.), Over The Top (OTT) messaging services/providers (such as Apple iMessage, BlackBerry Messenger, Whatsapp, Skype, Facebook Messenger, Google Talk, KakaoTalk, Viber, etc.) etc., including for example uploading network flow records/statistics (for example netflow statistics from the security agent to the network security service) for such communications, filtering, analysis and control including dynamic traffic steering and applying appropriate security defensive measures such as for example means to block or redirect such communications/traffic in data centre environments, mobile networks, fixed networks, enterprise networks, or any combination thereof etc.

In one embodiment the network security service has at least one network probe for data acquisition. The network security service analyses this data to ascertain if there are devices or applications on devices which are behaving suspiciously and/or originating suspicious events in the network, based on the traffic emanating from the device. The network probe can be an off-net network probe in communication with a network tap or can be an in-line traffic probe deployed inline on the traffic plane.

Advantageously the network probe in one embodiment could ignore traffic coming over the secure communications channel (for example VPN tunnel) to the network security service from a security agent of the invention, if for example the security agent were generating network flow records/statistics and/or network event records/statistics for such traffic to avoid duplication, but the network probe could generate network flow records/statistics and/or network event records/statistics for traffic not being sent through the secure communications channel. In this way the network probe could complement the statistics generated by a security agent of the invention.

The network probe comprises means for generating statistics on any layer of the communication stack that has information that is of interest and is adapted to send these to the network security system. The network probe can also generate network flow records/statistics or network event records/statistics for traffic such as data traffic comprising any type of messaging traffic or communication for instance a network event, such as a SMS message where it has visibility of the messaging traffic.

The network probe of the invention has the ability (which can be implemented via DPI capability/mechanism, including protocol identification and inspection capability), to generate, supplement and export or send network flow records/statistics (which in one embodiment are aggregated), for example network flow records incorporating statistics (such as for example IP traffic statistics) to the network security service. Thus for example the network probe can generate statistics for traffic and export those statistics for example as network flow records (in one embodiment for example generating and exporting statistics as netflow records). The network probe can also for example supplement such records or generate additional informational records by for example generating statistics on any layer of the communication stack that has information that is of interest (for example in one embodiment augmenting the netflow records incorporating statistics and/or by generating additional informational records), which the network probe generates and exports or uploads or sends (which can be periodically) to the network security service, with for example information (including recording and/or identifying information) such as content or for example with information from standards such as W3C (in other embodiments could be the same or different information in alternative formats including proprietary formats) extended log file format fields for Web server log files with such information as URL requested on a particular session, URL download size, timestamp etc.

In one embodiment the network probe is a netflow generator or exporter, although in other embodiments the network probe (and the network security service) can support other protocols besides netflow, using for example IPFix or sflow etc., or alternatively for example sending the records/statistics in an alternative protocol over for example a TCP/IP interface, or using other protocols including proprietary protocols or other means etc, for all traffic.

Advantageously, the invention has in network local security control presence wherever there are devices with the security agent installed (giving the invention ubiquitous in-network presence), with such active agents on a device, providing a very comprehensive view of what is happening in the network to the network security service (through steering traffic and uploading network flow records/statistics) and acting on instructions from the network security service based on analysis of such network data to perform in network security control.

Advantageously, the invention enables dynamic security threat detection, mitigation and control, and can be applied to many security threats including intrusion prevention, data loss prevention, anti-virus, botnet attacks, anti-spam, etc.

The invention applies to all variants of mobile network standards/technologies/environments and their associated families such as CDMA/3GPP2 family of standards/technologies/environments (for example IS-95/CDMA 2000 1×RTT/CDMA 2000 1×EV-DO/CDMA2000 1×EVDV, etc.), GSM/3GPP family of standards/technologies/environments (for example GPRS, EDGE, UMTS etc.) and beyond including more modern variants such as 3GPP IMS or 3GPP LTE/LTE Advanced/4G or WiMAX/WiMAX-advanced networks/standards/technologies/environments, and including hybrid networks/standards/technologies/environments and future networks/standards/technologies/environments, and applies also to fixed line such as wireline. The scope of the invention as well as applying to IP networks and any networks involved in packet communication also includes any access networks/standards/technologies/environments such as WiFi, WiMAX, WiMAX-advanced, DSL, Cable etc. or hybrid or variant networks/standards/technologies/environments or any combination of networks/standards/technologies/environments, for example WiFi/WiMAX accessing a mobile or fixed (for example cable) network.

The invention is not limited to but applies to any type of device involved in IP communication or other network communication. The invention supports all device identifiers and all methods of addressing devices, including Mobile IP addressing methods (IPV6), in addition to IPV4, etc.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory disk or stick or hard disk. The carrier may be an electrical or optical signal which may be transmitted via an electrical or an optical cable or by radio or other means. In the specification the terms "comprise, comprises, comprised and comprising" or any variation thereof and the terms include, includes, included and including" or any variation thereof are considered to be totally interchangeable and they should all be afforded the widest possible interpretation and vice versa. The invention is not limited to the embodiments described but may be varied in construction and detail.

The invention claimed is:

1. A security system for use in a communications network, said network comprising means to allow a plurality of devices to communicate over the network; a security agent configured on at least one device and adapted to communicate with the security system; said system comprising:
a security analytics module configured to store traffic patterns to and from devices in the network, the patterns used as baseline reference traffic patterns for detecting traffic to or from other devices; and
a steering control module configured to perform dynamic intelligent traffic steering from the device based on analysis of data traffic on the network or on the device by (i) storing a history for the device based on activity of the device over time, (ii) determining whether activity of the device matches out-of-the-ordinary characteristic patterns based on the baseline reference traffic patterns, (iii) assigning to the device a first policy configured for a matched characteristic pattern, and (iv) assigning a second policy to the device in response to and based on an analysis of behavioural changes of the device;
wherein the device's propensity to exhibit suspicious or normal behaviour in the past influences which policy is assigned to the device, and wherein the steering decision is made to select a channel on a per flow basis based on the policy assigned to the device.

2. The security system of claim 1 comprising means to dynamically control which user device data communications are steered via a particular path and/or based on information received from at least one security agent by selecting a channel for a particular flow.

3. The security system of claim 1 comprising means to perform control communications to the security agent to implement control measures, including targeted traffic steering to direct which user device data communications are sent on a particular path.

4. The security system of claim 1 comprising means for applying other intelligent dynamic control means to block and/or redirect such communications/traffic:
wherein the control communications comprises means for blocking enterprise traffic and/or internet traffic to/from the device, or blocking traffic for a particular user device for a particular service, for a particular application, for a particular protocol or on a particular session whilst allowing other traffic.

5. The security system as claimed in claim 1 comprising a dedicated secure control and/or communication channel between the security agent and the security system.

6. The security system of claim 1 comprising a dedicated secure control and/or communication channel between the security agent and the security system; wherein the dedicated secure control and communication channel comprises a VPN tunnel.

7. The security system of claim 1 comprising a dedicated secure control and/or communication channel between the security agent and the security system, wherein the dedicated secure control and/or communication channel comprises a plurality of tunnels, each tunnel is configured for a different service.

8. The security service of claim 1 comprising a dedicated secure control and/or communication channel between the security agent and the security system, wherein the dedicated secure control and/or communication channel comprises a plurality of tunnels, each tunnel is configured for a different service and wherein a first tunnel is configured for enterprise services, a second tunnel is configured to direct traffic to a network security service and a third un-tunnelled path is for general internet traffic.

9. The security system of claim 1 wherein the security agent is configured to determine a flow identifier for each packet sent via a VPN service, and further configured to determine a gateway or tunnel associated with the flow identifier; wherein the security agent steers traffic onto a tunnel based on the determined flow identifier.

10. The security system of claim 1 wherein the security agent is configured to determine a flow identifier for each packet sent via a VPN service, and further configured to determine a gateway or tunnel associated with the flow identifier; and wherein the security agent is configured to make steering decisions about traffic dynamically either in response to traffic type, originating application, general security threat levels prevalent at the time or other factors by steering the traffic to the appropriate VPN tunnel.

11. The security system claim 1 comprising means to control the dynamic traffic steering by communication with the security agent based on said analysis and use of DNS communications.

12. The security system of claim 1 comprising means to control the dynamic traffic steering by communication with the security agent based on said analysis and use of DNS communications in conjunction with control messages.

13. The security system of claim 1 wherein the data traffic comprises internet or IP traffic.

14. The security system of claim 1 wherein the security agent is adapted to perform packet inspection and filtering on the device, determining the protocol and applying policy control on the device.

15. The security system of claim 1 comprising means for implementing at least one policy wherein the policy comprises a rule set and means for associating a subscriber device with the policy:
wherein the rule set is based on observed behaviour of the device by the security system using a security analytics module.

16. The security system of claim 1 wherein a rule set is pushed as a control message by the system to the security agent on the device independently of and without requiring subscriber policies to be provisioned:
wherein a device is dynamically assigned to a policy based on device behavioural analysis and/or filtering by the security system.

17. The security system of claim 1 wherein a policy based rule set or an alternative rule set communicated to the security agent on the device comprises dynamic traffic steering or communications/traffic blocking and/or redirection.

18. The security system of claim 1 wherein the system is adapted to determine that a device activity matches normal characteristic patterns and assigns a policy to that device configured for said matched characteristic pattern.

19. The security system of claim 1 wherein the system is adapted to determine that a device is diverging from a normal characteristic pattern to an unknown pattern and assigns a policy to that device configured for said matched unknown characteristic pattern.

20. The security system of claim 1 wherein the security agent is adapted to generate network flow records comprising statistics for traffic to or from the device.

21. The security system of claim 1 wherein the security agent is adapted to generate network flow records comprising statistics for traffic to or from the device and the security agent is adapted to generate network event records comprising statistics or other information for messaging traffic or events pertaining to the user device, including statistics for SMS events, and is adapted to send the records to the security system.

22. A method of providing security in a communications network, said network comprising means to allow a plurality of devices to communicate over the network; a security agent configured on at least one device and adapted to communicate with the security system; said method comprising:

performing dynamic intelligent traffic steering from the device based on analysis of data traffic on the network or on the device, wherein the analysis of the data traffic includes:

storing traffic patterns to and from devices in the network, the patterns used as baseline reference traffic patterns for detecting traffic to or from other devices;

storing a history for the device based on activity of the device over time;

determining whether activity of the device matches out-of-the-ordinary characteristic patterns based on the baseline reference traffic patterns;

assigning to the device a first policy configured for a matched characteristic pattern, the device's propensity to exhibit suspicious or normal behaviour in the past influencing which policy is assigned to the device; and assigning a second policy to the device in response to and based on an analysis of behavioural changes of the device, and wherein the steering decision is made to select a channel on a per flow basis based on the policy assigned to the device.

23. The security system of claim 1 wherein the data traffic comprises messaging traffic or communication.

* * * * *